US011797100B1

(12) United States Patent
Fan

(10) Patent No.: US 11,797,100 B1
(45) Date of Patent: Oct. 24, 2023

(54) SYSTEMS AND METHODS FOR CLASSIFYING TOUCH EVENTS BASED ON RELATIVE ORIENTATION

(71) Applicant: Szu Wen Fan, Markham (CA)

(72) Inventor: Szu Wen Fan, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/952,121

(22) Filed: Sep. 23, 2022

(51) Int. Cl.
*G06F 3/01* (2006.01)
*G06F 3/0346* (2013.01)
*G06V 40/20* (2022.01)

(52) U.S. Cl.
CPC ............ *G06F 3/017* (2013.01); *G06F 3/0346* (2013.01); *G06V 40/28* (2022.01)

(58) Field of Classification Search
CPC ........ G06F 3/017; G06F 3/0346; G06F 3/014; G06F 3/03545; G06F 3/04883; G06F 3/0488; G06F 3/011; G06V 40/28; A63F 13/212; A63F 13/426; G02B 7/40
See application file for complete search history.

(56) References Cited

U.S. PATENT DOCUMENTS

| | | | | |
|---|---|---|---|---|
| 2011/0102333 A1* | 5/2011 | Westerman | ......... | G06F 3/04883 345/173 |
| 2014/0055352 A1* | 2/2014 | Davis | ...................... | G06F 3/014 345/156 |
| 2015/0258431 A1* | 9/2015 | Stafford | ................ | A63F 13/212 463/31 |
| 2015/0258432 A1* | 9/2015 | Stafford | ................ | A63F 13/426 463/32 |
| 2015/0363034 A1* | 12/2015 | Hinckley | ............ | G06F 3/03545 345/173 |
| 2015/0370472 A1* | 12/2015 | Privault | .................. | G06F 3/017 715/810 |
| 2016/0378251 A1* | 12/2016 | Aznoe | ................. | G06F 3/04883 345/158 |
| 2017/0364198 A1* | 12/2017 | Yoganandan | ......... | G06F 3/0488 |
| 2018/0074637 A1* | 3/2018 | Rosenberg | .......... | G06F 3/03545 |
| 2020/0133395 A1* | 4/2020 | Kaneko | ................. | G06F 3/0346 |
| 2021/0232224 A1* | 7/2021 | Cipoletta | ................ | G06F 3/011 |
| 2022/0121288 A1* | 4/2022 | Wu | .......................... | G02B 7/40 |

OTHER PUBLICATIONS

Goguey et al. Characterizing Finger Pitch and Roll Orientation During Atomic Touch Actions. CHI 2018 Paper. Apr. 21, 2018.
Chen et al. Duet: Exploring Joint Interactions on a Smart Phone and a Smart Watch. CHI 2014, One of a CHInd, Toronto, ON, Canada 2014.
Wilkinson et al. Expressy: Using a Wrist-worn Inertial Measurement Unit to Add Expressiveness to Touch-based Interactions. #chi4good, CHI 2016, San Jose, CA, USA 2016.

* cited by examiner

*Primary Examiner* — Richard J Hong

(57) ABSTRACT

Systems and methods of generate a classification of touch events are disclosed. A system may detect a first touch event, the first touch event being effected by a touch effector upon a touch receiver. The system may then determine a first touch gesture associated with the first touch event, determine an orientation associated with the touch effector, determine an orientation of the touch receiver, calculate a first relative orientation between the orientation associated with the touch effector and the orientation of the touch receiver, and generate a classification of the first touch event based on the first touch gesture and the first relative orientation.

20 Claims, 17 Drawing Sheets

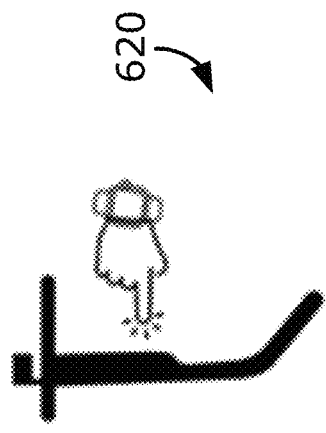
$R_{h2} \times R_{w2} = R_{c1}$
620
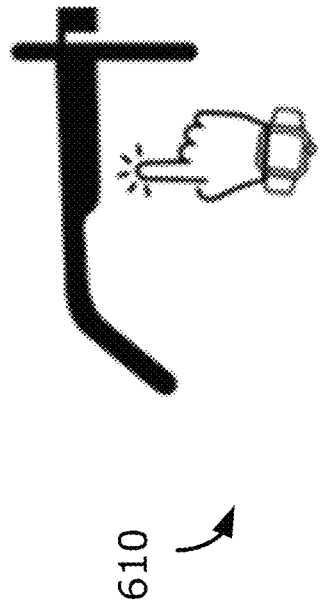
$R_{h1} \times R_{w1} = R_{c1}$
610
FIG. 6

1000A

Detect a first touch gesture
1002A

↓

Determine
$R_C(YPR)=(\mathbf{0},0,0)$
1004A

↓

Classify first touch event as slide with finger *pad*
1006A

↓

Adjust audio *volume*
1008A

Detect a second touch gesture
1002B

↓

Determine
$R_C(YPR)=(\mathbf{100},0,0)$
1004B

↓

Classify second touch event as slide with finger *side*
1006B

↓

Adjust audio *playhead*
1008B

FIG. 10B

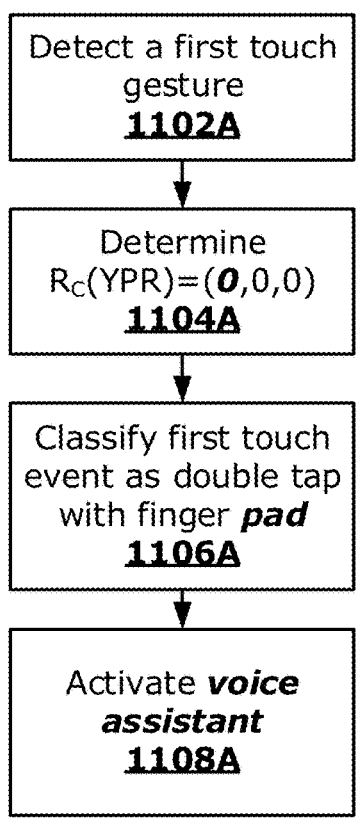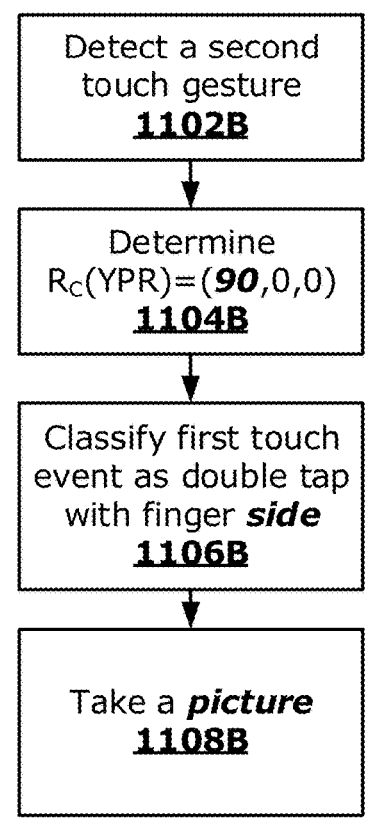
FIG. 11A  FIG. 11B

SYSTEMS AND METHODS FOR CLASSIFYING TOUCH EVENTS BASED ON RELATIVE ORIENTATION

RELATED APPLICATION DATA

This is the first patent application related to this matter.

FIELD

The present disclosure generally relates to touch enabled computing devices, and includes touch enabled computing devices having small touch surfaces.

BACKGROUND

Over recent years, touch-enabled computing devices have developed both in variety and in decreasing size. While these changes have increased the portability of these devices, they have necessitated increasingly smaller touch surfaces. Expanding the number of distinctly recognizable touch events beyond simple atomic touch events (tap, swipe, etc.) into more unique touch events (finger pad tap, finger side tap, etc.), may improve the use of touch devices, especially the use of touch devices where multi-finger gestures may be inaccessible due to a small touch surface, for example.

Many current approaches to increasing the number of distinctly recognizable touch events, such as those involving finger identification, multi-finger gestures, and using raw capacitive images, are power inefficient. Furthermore, current approaches may be error-prone, uncomfortable for the user, and device-specific, such as those requiring the use of fingerprint sensors, magnetic rings and/or vibration rings. Accordingly, improvements to the field are desired.

SUMMARY

According to some aspects of the present disclosure, there is provided a method of using the relative orientation between the orientation of a touch device apparatus (e.g., as sensed by the apparatus itself) and an orientation associated with a touch effector to differentiate the touch orientation characteristics of received touch gestures. The touch device apparatus may be any touch-enabled device, such as a smartphone, a tablet, smartglasses, a smartwatch, etc. The touch device apparatus may include a touch receiver, a processor and a memory as components.

In this way, expansion of the number of touch events that can be distinctly recognized by a device may be implemented in a power efficient manner (e.g., power-intensive techniques such as the constant processing of high resolution images are avoided). Furthermore, touch event classification may be performed in a manner which avoids misclassification of touch events (e.g., due to the misclassification of capacitive images and/or reliance on the absolute orientation of the touch effector). Using techniques of the present disclosure, activities commonly requiring more than one button, such as scrolling and selecting GUI elements, may be performed using a single button, thus simplifying the user interaction and reducing the amount of processing power required to recognize the input.

In accordance with an aspect of the present disclosure, there is provided a system comprising a processor; and a memory coupled to the processor, the memory storing instructions which, when executed by the processor, cause the system to detect a first touch event, the first touch event being effected by a touch effector upon a touch receiver; calculate a first relative orientation between an orientation associated with the touch effector and an orientation of the touch receiver; and generate a classification of the first touch event based on the first touch gesture and the first relative orientation.

Optionally, before the calculate, the system further to determine a first touch gesture associated with the first touch event; and determine an orientation associated with the touch effector; determine an orientation of the touch receiver.

In some implementations, the system further comprises at least one camera coupled to the processor for capturing a video view, and the system is further configured to identify the touch effector in the video view and to identify the touch receiver in the video view.

In some implementations, the system is a virtual reality (VR) system, the touch effector is a first hand of a user, and the touch receiver is a second hand of the user.

In some implementations, the system further comprises an effector orientation sensor for sensing the orientation associated with the touch effector.

In some implementations, the first relative orientation is calculated according to:

$$R_c = R_h \times R_w^{-1}$$

where $R_h$ is the orientation of the touch receiver, $R_w$ is the orientation of the effector orientation sensor, and $R_c$ is the first relative orientation.

In some implementations, the effector orientation sensor is a wearable device that is in proximity to the touch effector.

In some implementations, the touch receiver, the processor and the memory are components of a touch device apparatus.

In some implementations, the system includes the touch device apparatus and the effector orientation sensor.

In some implementations, the touch device apparatus is one of a type of a smartglasses, a smart watch, a tablet, or a smartphone.

In some implementations, the first relative orientation includes pitch, yaw and roll information, and generating the classification of the first touch event using the first touch gesture and the first relative orientation includes generating the classification of the first touch event based on the first touch gesture and the pitch, yaw and roll information.

In some implementations, the system is further caused to trigger a first action corresponding to the classification of the first touch event.

In some implementations, the system is further caused to detect a second touch event, the second touch event comprising a second touch gesture that is the same as the first touch gesture and a second relative orientation that is different than the first relative orientation; generate a classification of the second touch event that is different than the classification of the first touch event; and trigger a second action corresponding to the classification of the second touch event, the second action being different than the first action.

In some implementations, the first touch gesture includes a displacement parameter and classifying the first touch event is based on the displacement parameter.

In some implementations, the first touch gesture includes a time duration parameter and classifying the first touch event is based on the time duration parameter.

In accordance with another aspect of the present disclosure, there is provided a method for classifying a first touch event, the method comprising detecting the first touch event, the first touch event being effected by a touch effector upon a touch receiver; calculating a first relative orientation between an orientation associated with the touch effector and an orientation of the touch receiver; and generating a classification of the first touch event.

Optionally, before the calculating, further comprising: determining a first touch gesture associated with the first touch event; and determining an orientation associated with the touch effector; determine an orientation of the touch receiver.

In some implementations, the first relative orientation is calculated according to:

$$R_c = R_h \times R_w^{-1}$$

where $R_h$ is the orientation of the touch receiver, $R_w$ is the orientation associated with the touch effector, and $R_c$ is the first relative orientation.

In some implementations, the first relative orientation includes pitch, yaw and roll information, and classifying the first touch event using the first relative orientation includes generating the classification of the first touch event based on the first touch gesture and the pitch, yaw and roll information.

In some implementations, the method further comprises triggering a first action corresponding to the classification of the first touch event.

In some implementations, the method further comprises detecting a second touch event, the second touch event comprising a second touch gesture that is the same as the first touch gesture and a second relative orientation that is different than the first relative orientation; generating a classification of the second touch event that is different than the classification of the first touch event; and triggering a second action corresponding to the classification of the second touch event, the second action being different than the first action.

In accordance with an aspect of the present disclosure, there is provided a non-transitory computer-readable medium having machine-executable instructions stored thereon, the machine-executable instructions, when executed by a processor of a device, cause the device to detect a first touch event, the first touch event being effected by a touch effector upon a touch receiver; determine a first touch gesture associated with the first touch event; determine an orientation associated with the touch effector; determine an orientation of the touch receiver; calculate a first relative orientation between the orientation associated with the touch effector and the orientation of the touch receiver; and generate a classification of the first touch event based on the first touch gesture and the first relative orientation.

BRIEF DESCRIPTION OF THE DRAWINGS

Reference will now be made, by way of example, to the accompanying drawings which show example embodiments of the present disclosure, and in which:

FIG. 6 shows a representation of the constancy of the relative orientation between a touch receiver and a touch effector for the same set of touch gestures in accordance with examples described herein;

FIG. 10A is a flowchart of a method for adjusting audio volume using a touch gesture, in accordance with examples described herein;

FIG. 10B is a flowchart of a method for adjusting an audio playhead using a touch gesture, in accordance with examples described herein;

FIG. 11A is a flowchart of a method for activating a voice assistant using a touch gesture, in accordance with examples described herein;

FIG. 11B is a flowchart of a method for taking a picture using a touch gesture, in accordance with examples described herein;

Similar reference numerals may have been used in different figures to denote similar components.

DESCRIPTION OF EXAMPLE EMBODIMENTS

Figure 1A:
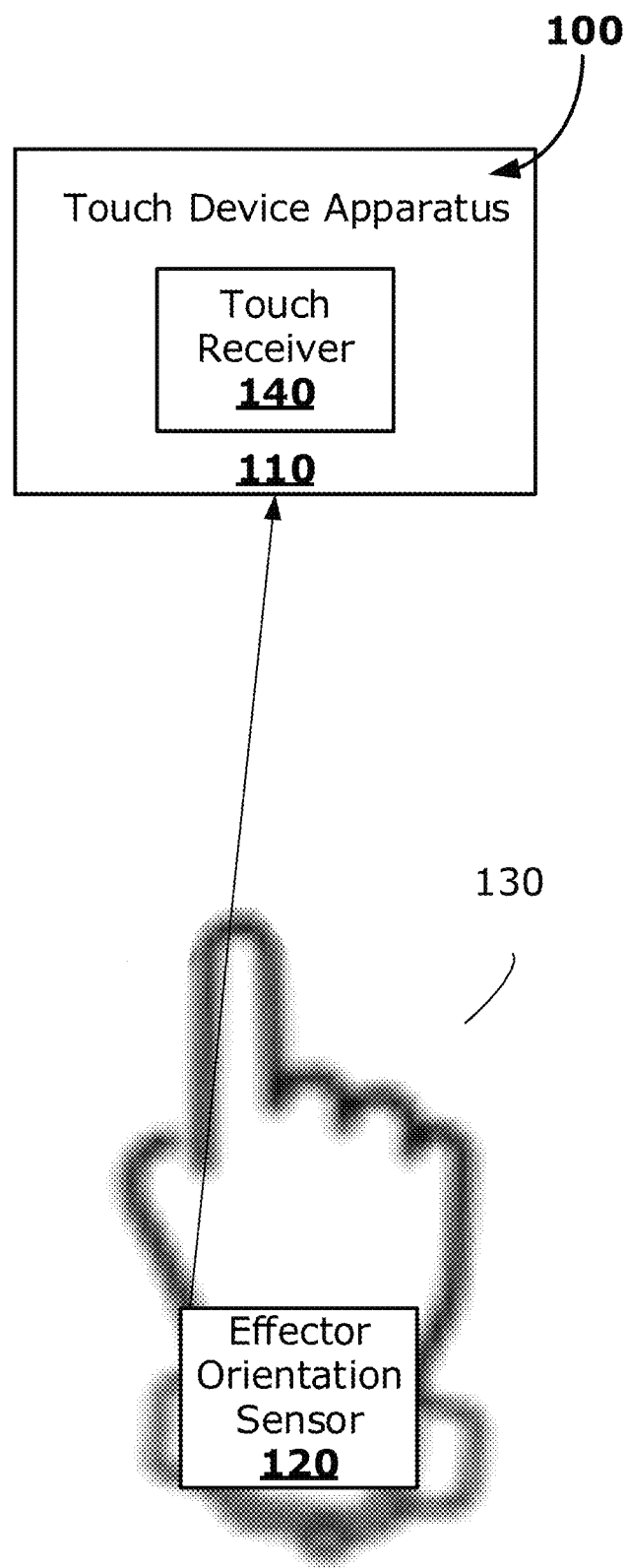
FIG. 1A is an is a schematic diagram illustrating a first operating environment of an example embodiment, in accordance with examples described herein.

In various examples, the present disclosure describes systems and methods in which a touch gesture is classified based on the relative orientation between a touch receiver and the touch effector. For a given touch event (e.g., a finger side tap, a finger pad swipe, etc.), the relative orientation between the touch receiver and the touch effector may be within the same defined range, regardless of how the touch device apparatus is oriented (flat, vertical, slanted, etc.). When a touch device apparatus is oriented to a different angle, the touch effector may also require a reorientation by the different angle in order to maintain the same touch event parameters. As a result, even though the individual orientations of the touch device apparatus and the touch effector may be different in certain implementations, their relative orientation may be within the same defined range in those same certain implementations.

Touch interactions may be classified into two main categories. The first is the direct manipulation of a graphical user interface (GUI), such as a single tap to select an application on a smartphone and a slide gesture to change the volume on a smartphone. The second is the indirect interaction to invoke a command, such as a double tap to activate a smartphone camera and a long press to activate a smartphone voice assistant. Conventionally available touch gesture input is quite atomic, i.e., limited to a simple tap, slide, swipe, etc.

There are two major conventional approaches to expanding the number of distinctly recognizable touch events of commercial touch devices. The first approach is to expand a touch interaction spatially and the second is to expand the touch interaction temporally. A spatial expansion provides a touch gesture with one or more displacement parameters, i.e., additional contextual meaning based on the spatial properties of the touch gesture on the touch receiver. Examples of touch gestures including a displacement parameter include touching sequentially at different locations, multi-touch, etc. However, a spatial expansion requires a touch receiver of a certain size (e.g. a two finger pinch requires more touch space than a one finger swipe), which prevents spatial expansions from being used with miniature touch receivers, such as those used on smartglasses. A temporal expansion provides a touch gesture with one or more time duration parameters, i.e., additional contextual meaning based on time. Examples of touch gestures including a time duration parameter include a double tap, a triple tap, a long press, etc. However, a temporal expansion may be time inefficient, and may be error-prone, as the user may incorrectly time multiple taps and/or may trigger an unintended multi-tap. For example, tap-tap - - - tap may be mistaken as a double tap followed by a single tap, even though it was intended to be a triple tap.

A third approach to expanding the number of distinctly recognizable touch events of commercial touch devices is the orientation of the touch effector with respect to the touch receiver.

In the present disclosure, the term "XR" refers to "extended reality", which includes virtual reality (VR), augmented reality (AR), and mixed reality (MR) for the purposes of this disclosure. As used herein, XR refers to the presentation of virtual visual elements to a user through an XR display.

In the present disclosure, the term "display device" refers to an electronic display configured to display visual information, such as an LED, LCD, or CRT monitor.

In the present disclosure, the term "wearable XR display" refers to a wearable electronic device configured to present virtual visual elements to a user's eye or eyes. A wearable XR display is typically an immersive stereoscopic display capable of simulating the effects of binocular vision in a 3D environment, such as a binocular head-mounted display (HMD) in the form of smart glasses or goggles, but in some examples may be a monoscopic display such as a conventional 2D display screen capable of rendering 3D environments by projecting them onto two dimensions. A wearable XR display may be limited to one or more display devices, or may also include other components, such as hardware and/or software components used to compute, render, and/or display information on the display.

In the present disclosure, statements that a second element is "based on" a first element mean that characteristics of the second element are affected or determined at least in part by characteristics of the first element. The first element may be considered an input to an operation or calculation, or a series of operations or computations, which produces the second element as an output that is not independent from the first element.

Reference is first made to FIG. 1A, which is a schematic diagram illustrating a first example operating environment 100 of an example embodiment. In particular, FIG. 1A illustrates exemplary systems that cooperate in the environment 100 for generating a classification of a first touch event based on a first touch gesture and a first relative orientation.

As illustrated, the first example operating environment 100 includes a touch device apparatus 110 and an effector orientation sensor 120 that are in communication.

The touch device apparatus 110 may be a touch-enabled computing device configured to receive a touch gesture from one or more touch effectors 130. The touch device apparatus 110 includes a touch receiver which may be an input device, such as a touch pad, a touch screen, or a button, associated with the touch device apparatus 110.

The effector orientation sensor 120 may be associated with a touch effector 130, and the orientation of the effector orientation sensor 120 may be associated with the orientation of the touch effector 130. The effector orientation sensor 120 may directly or indirectly provide orientation information associated with the touch effector 130.

In the first example operating environment 100, the effector orientation sensor is depicted as a wearable device that is in proximity to the touch effector. While FIG. 1A depicts the effector orientation sensor 120 as a watch, and further depicts the touch effector 130 as an index finger extending from a wrist about which the watch is worn, other implementations are possible. For example, in embodiments where the touch effector 130 is a finger, the effector orientation sensor 120 may be a smartring or a smartband, for example. In some embodiments, the touch effector 130 and the effector orientation sensor 120 may be combined in a stylus.

The effector orientation sensor 120 may be embodied in any suitable device having an IMU and a communications module.

Figure 1B:
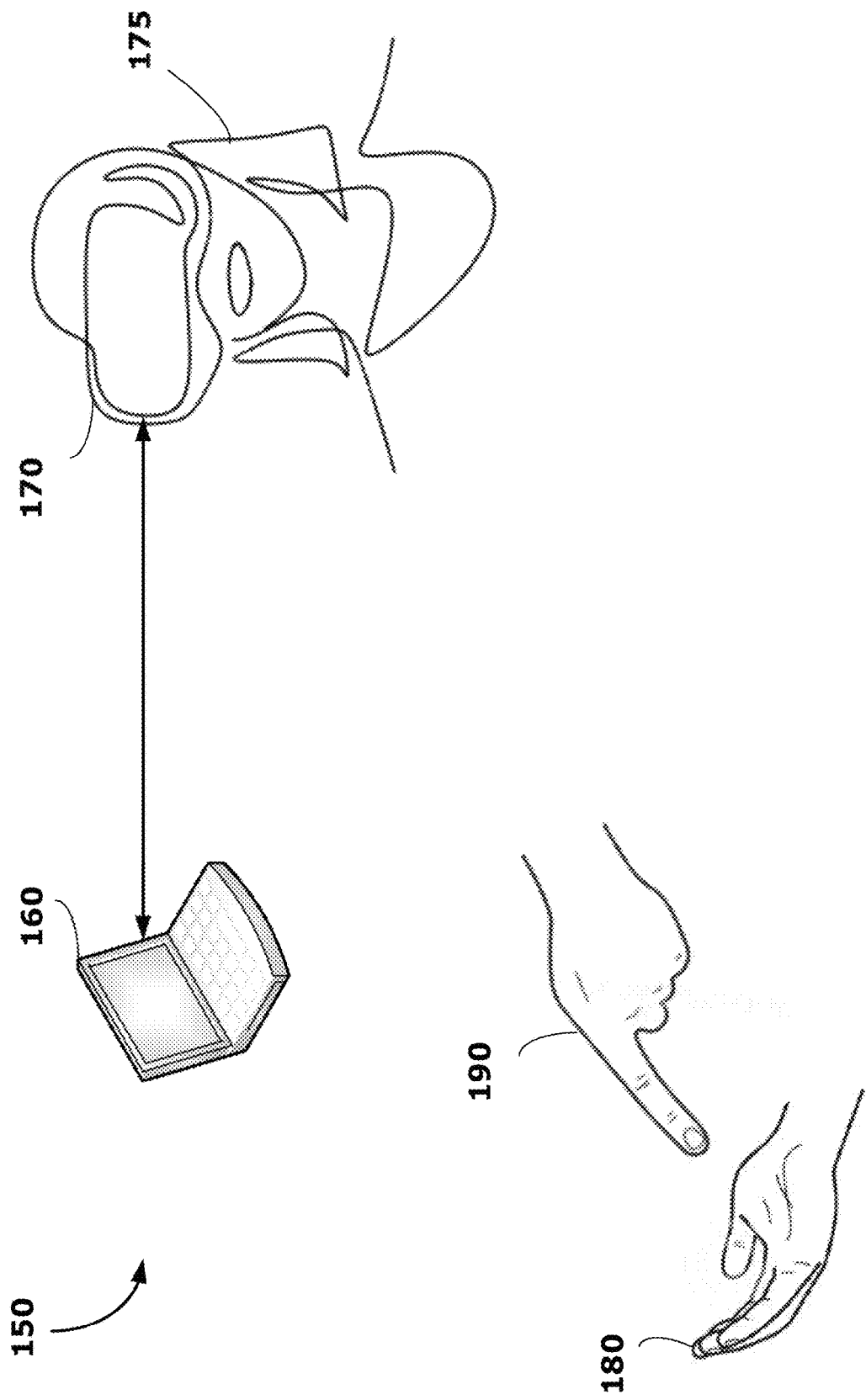
FIG. 1B is an is a schematic diagram illustrating a second operating environment of an example embodiment, in accordance with examples described herein.

FIG. 1B is a schematic diagram illustrating a second example operating environment 150 of another example embodiment. In particular, FIG. 1B illustrates exemplary systems that cooperate in the environment 150 for generating a classification of a first touch event based on a first touch gesture and a first relative orientation.

The second example operating environment 150 includes an XR computing device 160 in communication with a wearable XR display 170. The wearable XR display 170 may include a camera for capturing a video view, and the video view may include the hands 180, 190 of a user 175. The first hand 180 may be used as a touch receiver (also referred to as a virtual touchpad), in a similar manner to that of using a smartphone or a smartpad. The second hand 190 may operate as a touch effector.

In some embodiments, the XR computing device 160 may be configured to identify the touch effector (the second hand 190) and the touch receiver (the first hand 180) in the video view, and to identify the orientation of the first hand and the orientation of the second hand using computer vision techniques.

In some embodiments, haptic gloves (not shown) may be worn on the hands 180, 190. Haptic gloves are an input device for human-computer interaction, and may include one or more of a magnetic tracking device and an inertial measurement unit (IMU). When worn on the hands 180, 190, the haptic gloves may be in communication with the XR computing device 160 and/or the wearable XR display 170. When worn on the hands 180, 190, the XR computing device 160 may be configured to process images captured by the camera showing movements of a user's fingers in relation to one or more tactile input surfaces on one or more of the haptic gloves to generate tactile data, such as pointer data or gesture data, using computer vision techniques for implementing a gesture recognition system and/or a virtual pointer device.

In some embodiments, the XR computing device 160 may also process IMU data received from the wearable XR display 170 and/or from the haptic gloves to generate user 175 head and/or hand 180, 190 orientation and head and/or hand 180, 190 movement data.

Figure 2:
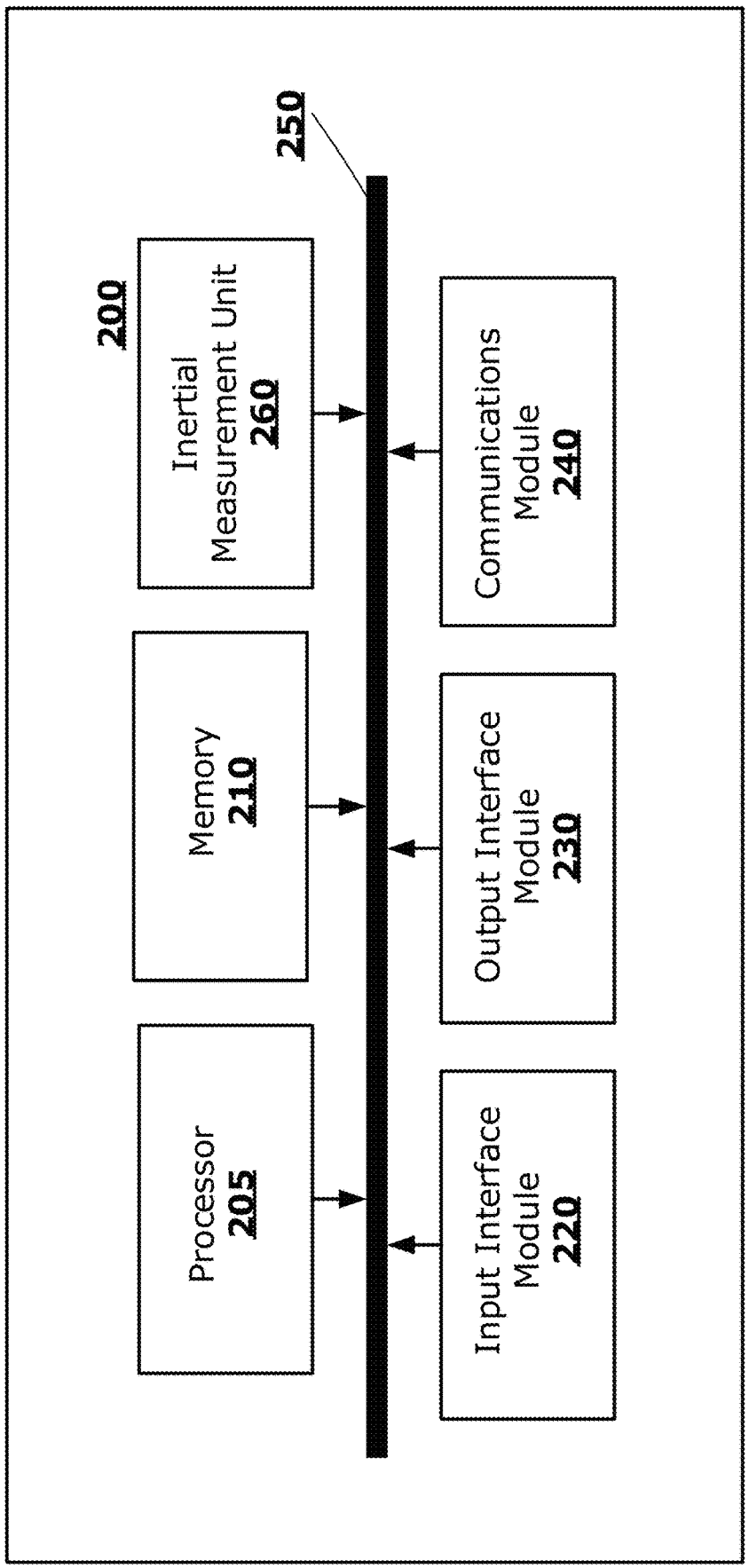
FIG. 2 is high-level operation diagram of an example computing device, in accordance with examples described herein.

FIG. 2 is a high-level operation diagram of an example computing device 200. In at least some embodiments, the example computing device 200 may be exemplary of one or more of the touch device apparatus 110 (FIG. 1A) or the XR computing device 160 (FIG. 1B), and is not intended to be limiting.

The example computing device 200 includes a variety of modules. For example, as illustrated, the example computing device 200 may include a processor 205, a memory 210, an input interface module 220, an output interface module 230, and a communications module 240. As illustrated, the foregoing example modules of the example computing device 200 are in communication over a bus 250.

The processor 205 is a hardware processor. The processor 205 may, for example, be one or more of a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 220 allows the example computing device 200 to receive input signals. Input signals may, for example, correspond to input received from a user. The input interface module 220 may serve to interconnect the example computing device 105 with one or more input devices. Input signals may be received from input devices by the input interface module 220. In some embodiments, all or a portion of the input interface module 220 may be integrated with an input device. Input devices may, for example, include one or more of a touchscreen, a touchpad, a button, a keyboard, a trackball, haptic gloves, a camera, or the like. The touch device apparatus 110 (FIG. 1) includes a touch receiver which may be an input device, such as a touch pad, a touch screen, or a button, associated with the touch device apparatus 110.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as a liquid crystal display (LCD), a touchscreen display, or the like. Additionally, or alternatively, output devices may include devices other than screens such as, for example, a speaker, a camera, indicator lamps (such as light-emitting diodes (LEDs)), speakers, and printers. In some embodiments, all or a portion of the output interface module 230 may be integrated with an output device.

The communications module 240 allows the example computing device 105 to communicate with other electronic devices and/or various communications networks. For example, the communications module 240 may allow the example computing device 200 to send or receive communications signals. Communications signals may be sent or received according to one or more protocols or according to one or more standards. For example, the communications module 240 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 200 to communicate using near-field communication (NFC), via Wi-Fi.™, using Bluetooth.™ or via some combination of one or more networks or protocols. In some embodiments, all or a portion of the communications module 240 may be integrated into a component of the example computing device 200. For example, the communications module may be integrated into a communications chipset.

Software comprising instructions is executed by the processor 205 from a computer-readable medium. For example, software may be loaded into random-access memory from persistent storage of memory 210 or other software source. Additionally, or alternatively, instructions may be executed by the processor 205 directly from read-only memory of memory 210.

Figure 3:
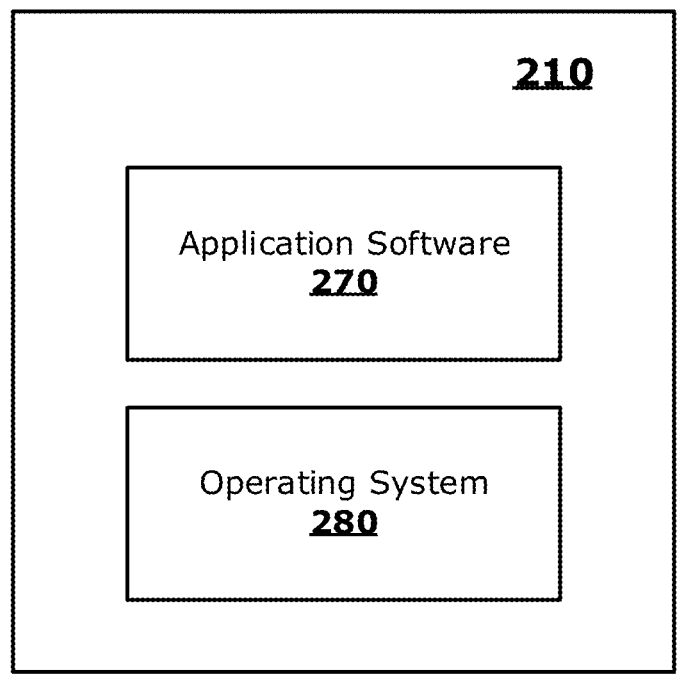
FIG. 3 depicts a simplified organization of software components stored in memory of the example computing device, in accordance with examples described herein.

FIG. 3 depicts a simplified organization of software components that may be stored in memory 210 of the example computing device 200. As illustrated, these software components include application software 270 and an operating system 280.

The application software 270 adapts the example computing device 200, in combination with the operating system 280, to operate as a device performing a particular function. In some embodiments, the application software 270 may comprise a touch event expansion application. The touch event expansion application may, for example, receive input from two devices and may process that input to generate a classification of a first touch event. For example, the touch event expansion application may receive input from one or more of the IMU 260 and/or the input interface modules of one or more computing devices 200, and may process this input to generate a classification of a first touch event. The touch event expansion application may then trigger a first action corresponding to the first touch event.

The operating system 280 is software. The operating system 280 allows the application software 270 to access the processor 205, the memory 210, the input interface module 220, the output interface module 230, the communications module 240, and the IMU 260. The operating system 280 may be, for example, Apple iOS™, Google™, Android™, Linux™, Microsoft™, Windows™, Harmony™, FreeRTOS™, or the like.

Figure 4:
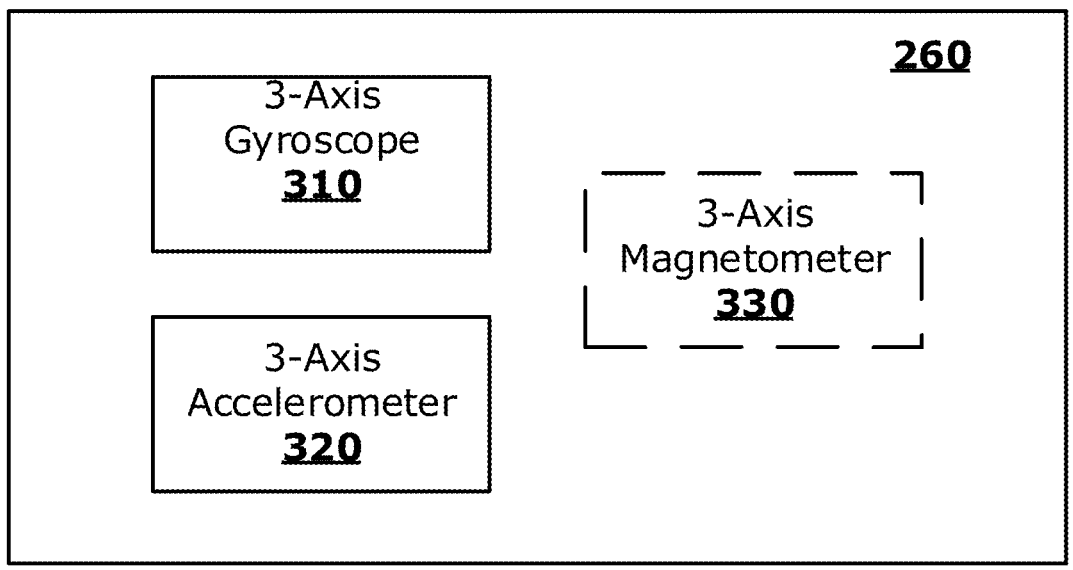
FIG. 4 depicts an organization of components within an inertial measurement unit (IMU), in accordance with examples described herein.

FIG. 4 depicts an organization of example components within the IMU 260. The IMU 260 is a device that can measure and report the specific force (or proper acceleration) and the angular rate (or angular velocity) of an object to which it is attached. As illustrated, the components of the IMU 260 may include a 3-axis gyroscope 310, a 3-axis accelerometer and an optional 3-axis magnetometer.

A gyroscope is an inertial sensor that measures an object's angular rate with respect to an inertial reference frame. An accelerometer measures inertial acceleration, or the change in velocity over time. An inertial system consisting of a 3-axis accelerometer and a 3-axis gyroscope may be referred to as a 6-axis system as it provides two different measurements along each of the three axes for a total of six measurements. A 3-axis magnetometer measures the strength and direction of the surrounding magnetic field, and may be included in the IMU 260 for extra precision.

Embodiments of the present disclosure provide for the classification of a touch event based on the type of touch gesture and the orientation characteristic of the touch effector with respect to the touch receiver at the time of the touch gesture. The touch gesture may additionally have a displacement parameter and/or a time duration parameter.

The orientation characteristic of the touch effector with respect to the touch receiver may be described with respect to a 3-dimensional axis using terms of "pitch" (normal axis), "yaw" (transverse axis) and "roll" (longitudinal axis). In some embodiments, generating the classification of a touch event using the touch gesture and the relative orientation may include generating the classification of the touch event based on the first touch gesture and the pitch, yaw and roll information.

Figure 5A:
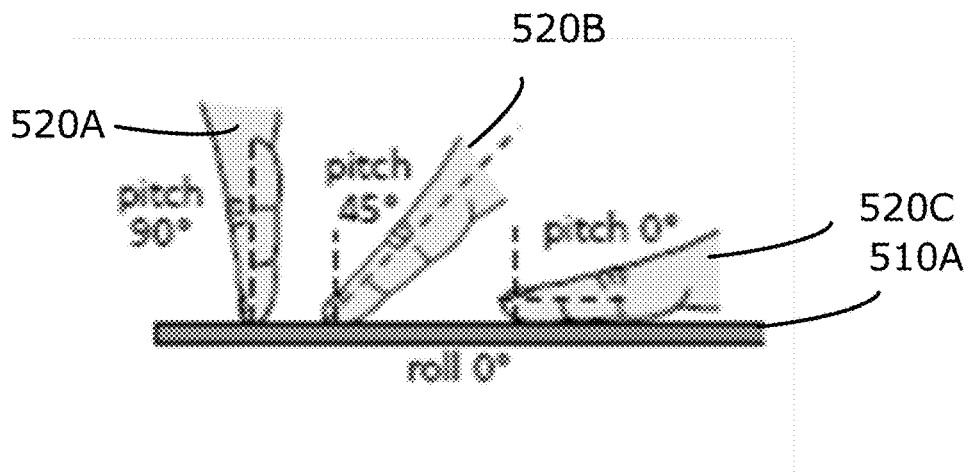
FIG. 5A depicts touch effectors in a first set of differing positions with respect to a touch receiver, in accordance with examples described herein.
Figure 5B:
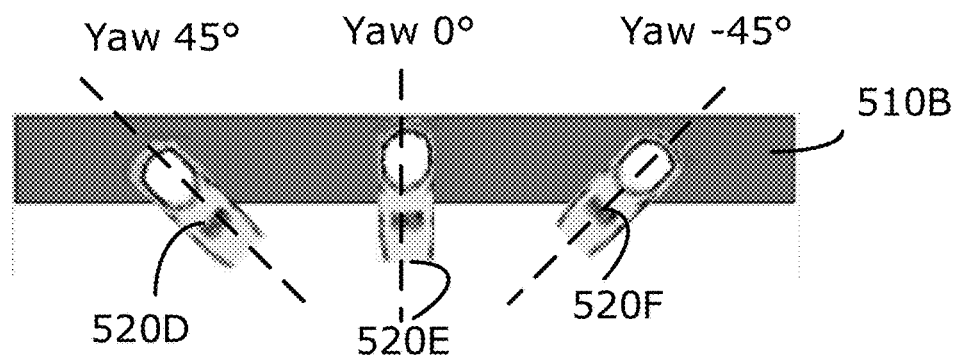
FIG. 5B depicts touch effectors in a second set of differing positions with respect to a touch receiver, in accordance with examples described herein.
Figure 5C:
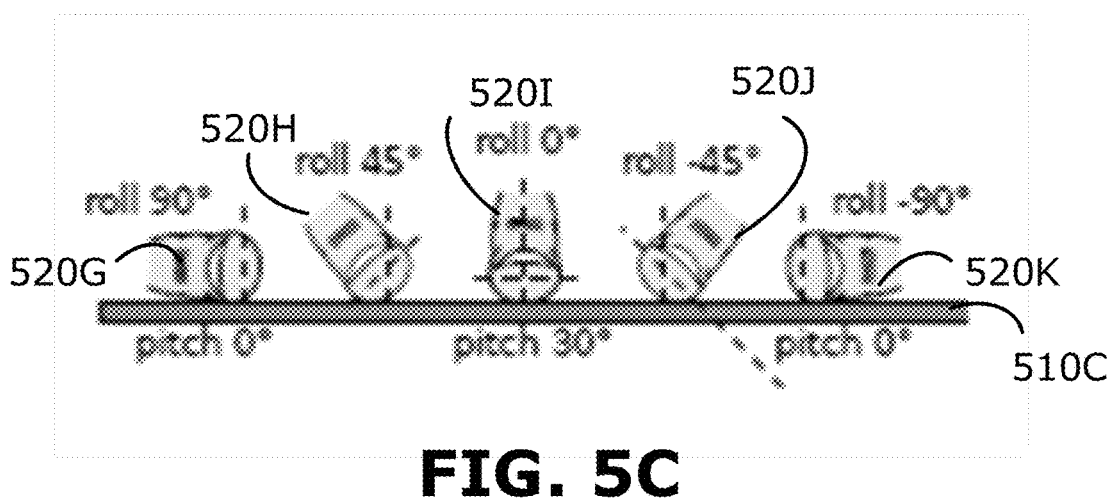
FIG. 5C depicts touch effectors in a third set of differing positions with respect to a touch receiver, in accordance with examples described herein.

FIGS. 5A, 5B and 5C depict example characteristics of touch effectors 520A-K while touching touch receivers 510A-C in terms of pitch, yaw and roll orientation.

FIG. 5A depicts the touch effectors 520ABC in differing positions with respect to the touch receiver 510A. Touch effector 520A illustrates an orientation having a pitch of 90° with respect to the touch receiver 510A. Touch effector 520B illustrates an orientation having a pitch of 45° with respect to the touch receiver 510A. Touch effector 520C illustrates an orientation having a pitch of 0° with respect to the touch receiver 510A. The touch effectors 520A-C are illustrated having a roll 0° with respect to touch receiver 510A.

FIG. 5B depicts the touch effectors 520DEF in differing positions with respect to the touch receiver 510B. Touch effector 520D illustrates an orientation having a yaw of 45° with respect to the touch receiver 510B. Touch effector 520E illustrates an orientation having a yaw of 0° with respect to the touch receiver 510B. Touch effector 520F illustrates an orientation having a yaw of −45° with respect to the touch receiver 510B.

FIG. 5C depicts the touch effectors 520G-K in differing positions with respect to the touch receiver 510C. Touch effector 520G illustrates an orientation having a roll of 90° and a pitch of 0° with respect to the touch receiver 510C. Touch effector 520H illustrates an orientation having a roll of 45° with respect to the touch receiver 510C. Touch effector 520I illustrates an orientation having a roll of 0° and a pitch of 30° with respect to the touch receiver 510C. Touch effector 520J illustrates an orientation having a roll of −45° with respect to the touch receiver 510C. Touch effector 520K illustrates an orientation having a roll of −90° and a pitch of 0° with respect to the touch receiver 510C.

As previously noted, current approaches to touch event expansion which consider the orientation of the surface receiving the touch gesture do not consider the relative orientation of the device effecting the touch gesture. Such existing approaches rely on the absolute orientations of the touch receiver and the touch effector, and do not consider the relative orientation of the touch receiver and the touch effector. FIG. 6 illustrates a representation of the constancy of the relative orientation, $R_c$, between a touch receiver and a touch effector for the same set of relative gestures, consistent with examples described in the present disclosure.

With reference to FIG. 6, position 610 depicts a first smartglasses positioned near a first finger extending from a first hand wearing a first smartwatch. Position 620 depicts a second smartglasses positioned near a second finger extending from a second hand wearing a second smartwatch.

As shown, while the respective orientations of the smartglasses and of the fingers are different across the positions 610 and 620 (i.e., $R_{h1} \neq R_{h2}$, $R_{w1} \neq R_{w2}$), The relative orientation is constant across both positions 610, 620 (i.e., $R_{c1} = R_{c2}$).

$R_h$ and $R_w$ may be obtained separately using any known methods of orientation determination, such as IMU sensor fusion. $R_h$ and $R_w$ may be obtained separately by performing a sensor fusion of an IMU's accelerometer, gyroscope, (and, optionally, magnetometer) sensor readings to produce orientation readings. The orientation readings may be obtained, for example, using any method commonly used for Altitude and Heading Reference System (AHRS), such as the Mahony and the Madgwick algorithms.

Figure 7:
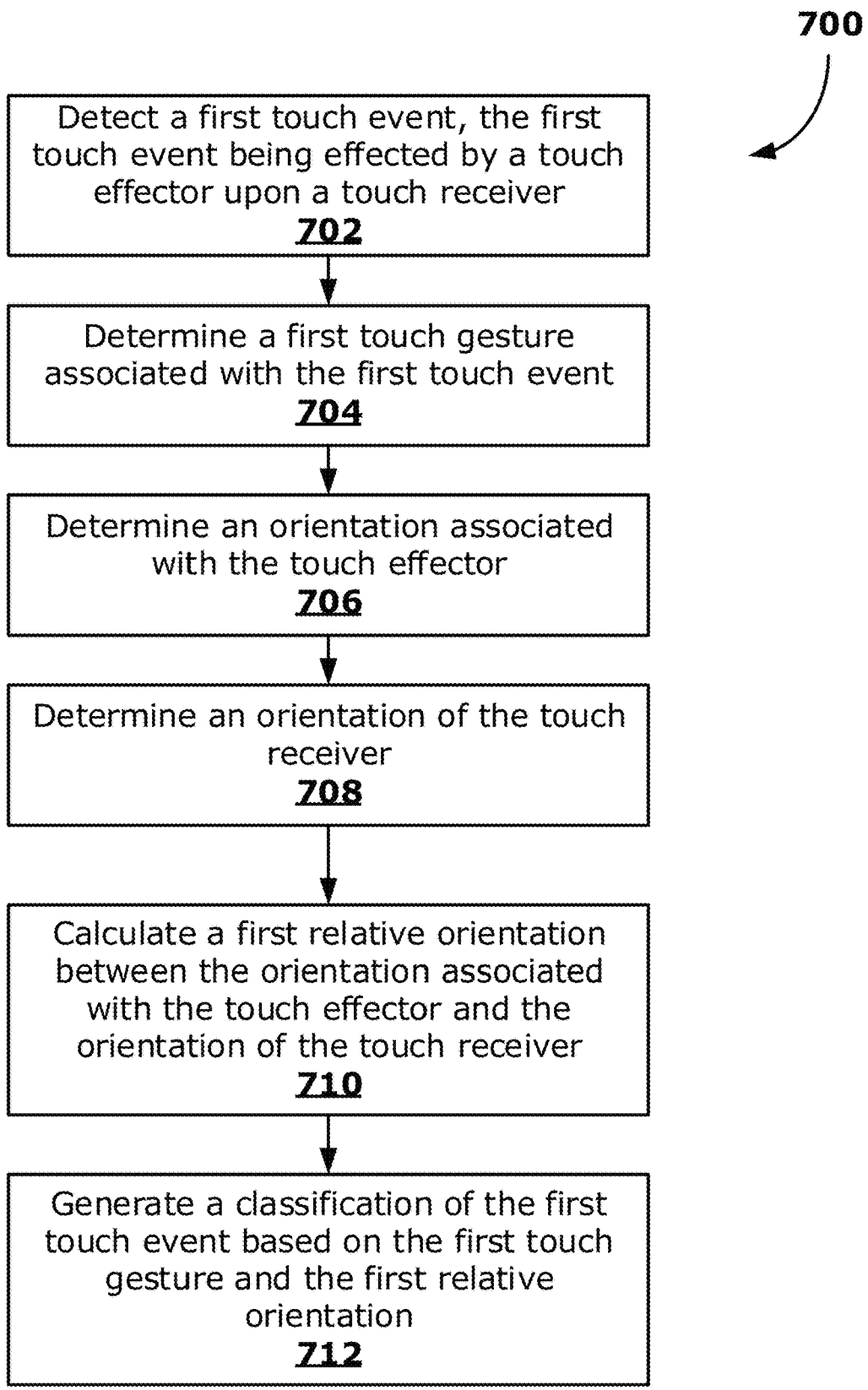
FIG. 7 is a flowchart of a method of generating a classification of a touch event, in accordance with examples described herein.

FIG. 7 is a flowchart of an example method 600 of generating a classification of a touch event, in accordance with an embodiment of the present disclosure. The method 700 may be performed by one or more processors of a computing device. Specifically, the operations 702 and onward may be performed by one or more processors of a touch device apparatus or by one or more processors of an XR computing device.

At operation 702, the system detects a first touch event, the first touch event being effected by a touch effector upon a touch receiver. The first touch event may comprise a first touch gesture and a first touch orientation. The first touch gesture may have a displacement parameter and/or a time duration parameter.

At operation 704, the system determines a first touch gesture. In some embodiments, the first touch gesture may have a spatial displacement parameter and/or a time duration parameter. For example, a touch gesture having a spatial displacement parameter may include additional contextual meaning based on the spatial properties of the touch gesture upon the touch receiver, (for example, sequential touching at different locations, multi-touch, swipe, etc.). As another example, a touch gesture having a time duration parameter may include additional contextual meaning based upon the duration of the touch gesture upon the touch receiver (for example, double tap, triple tap, long press, etc.). A touch gesture may have both a spatial displacement parameter and a time duration parameter.

At operation 706, the system determines an orientation associated with the touch effector. The touch effector may be, for example, a finger or a stylus. The orientation of the touch effector may be determined directly or indirectly. For example, in some embodiments where the touch effector is a stylus, the orientation associated with the stylus may be determined directly, for example, via an IMU within the stylus. In some embodiments where the touch effector is a finger, the orientation associated with the finger may be determined via an IMU of an associated wearable device. The associated wearable device may be worn on the finger or elsewhere on the associated hand, wrist or arm, and may be a smart ring or a smart watch. A device used to determine the orientation associated with the touch effector may be described as an effector orientation sensor. The effector orientation sensor may be a wearable device that is in proximity to the touch effector.

To enable orientation measurements, the touch effector and/or the effector orientation sensor may include an IMU having a six-axis gyroscope that includes one or more accelerometers. In some implementations, the IMU may also contain one or more magnetometers.

The orientation associated with the touch effector may be determined using any of a number of known methods. For example, any existing method that performs a sensor fusion of the IMU's sensor readings to produce orientation readings may be used, such as those used commonly for Altitude and Heading Reference System (AHRS). For example, the Mahony algorithm and/or the Madgwick algorithm may be used.

At the operation 708, the system determines an orientation of the touch receiver. The touch receiver may be a touch-enabled computing device such as a smart glasses or a smart phone.

To enable orientation measurements, the touch receiver may include an IMU having a six-axis gyroscope that includes one or more accelerometers. In some implementations, the IMU may also contain one or more magnetometers.

The orientation associated with the touch receiver may be determined using any of a number of known methods. For example, any existing method that performs a sensor fusion of the IMU's sensor readings to produce orientation readings may be used, such as those used commonly for AHRS. For example, the Mahony algorithm and/or the Madgwick algorithm may be used.

At the operation 710, the system calculates a first relative orientation between the orientation associated with the touch effector and the orientation of the touch receiver. In some embodiments, the first relative orientation may be calculated by obtaining the cross product of the orientation associated with the touch effector and the orientation of the touch receiver. In other words, the first relative orientation may be calculated according to:

$$R_c = R_h \times R_w^{-1}$$

where $R_h$ is the is the orientation of the touch receiver, $R_w$ is the orientation associated with the touch effector, and $R_c$ is the first relative orientation between the orientation associated with the touch effector and the orientation of the touch receiver. The first relative orientation may include pitch, yaw and roll information. It should be understood that other techniques for calculating the first relative orientation may be used.

At the operation 712, the system generates a classification of the first touch event based on the first touch gesture and the first relative orientation. In this way, the same touch gesture (e.g., a tap) may be classified as a different touch event based on a difference in $R_c$, thereby expanding the number of distinctly recognizable touch events to a wide range of motion of a human hand, or to a wide range of motion of another touch effector. In some embodiments, classifying the first touch event is based on a duration parameter and/or a time duration parameter. In some embodiments, generating the classification of a first touch event using the first touch gesture and the first relative orientation may include generating the classification of the first touch event based on the first touch gesture and the pitch, yaw and roll information.

Figure 8:
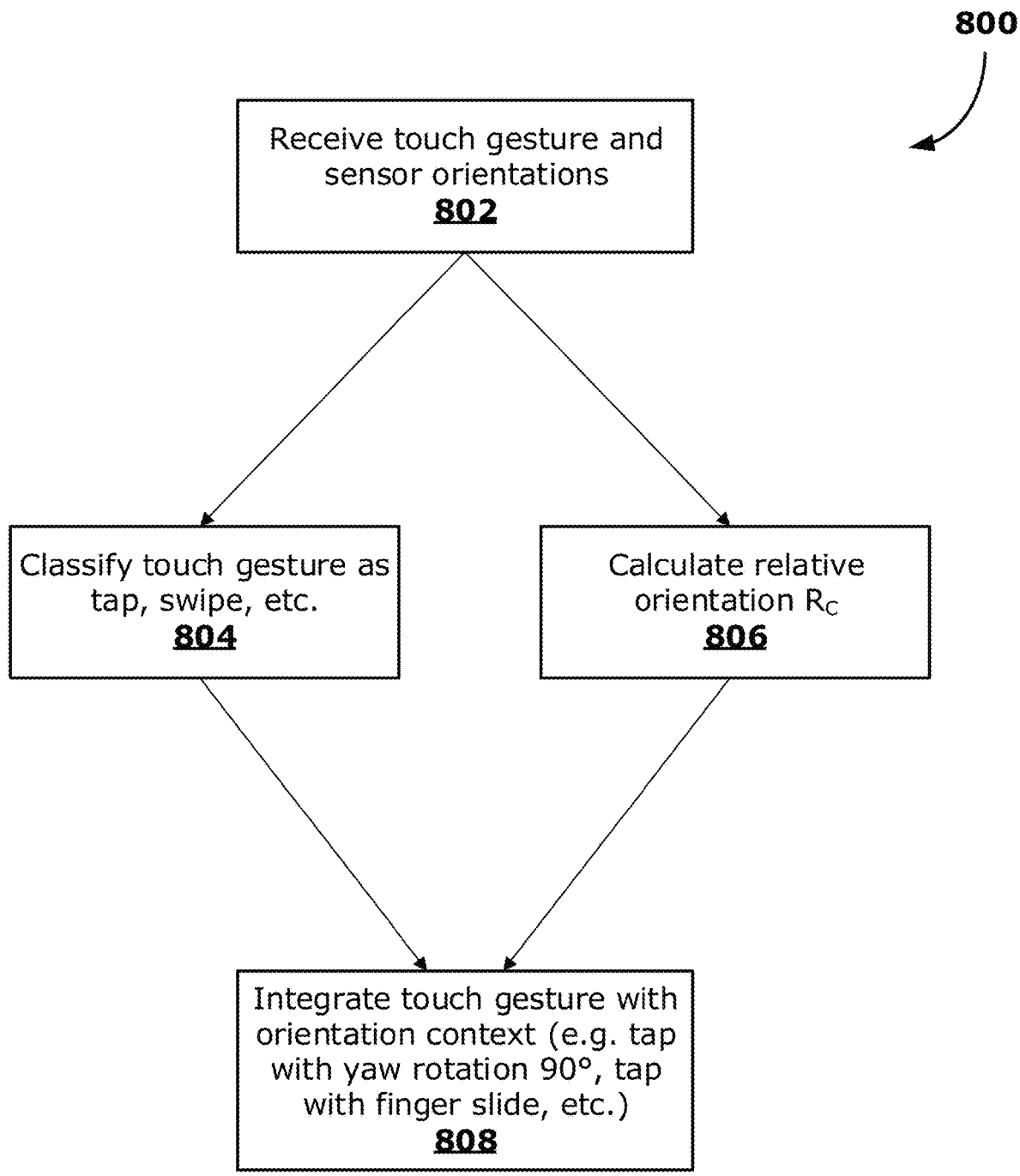
FIG. 8 is a flowchart illustrating a method of touch event classification, in accordance with examples described herein.

FIG. 8 is a flowchart illustrating an example method 700 of touch event classification, in accordance with an aspect of the present disclosure. The method 800 may be implemented by one or more processors of a computing device. Specifically, the operations 802 and onward may be performed by one or more processors of a touch device apparatus or an XR computing device.

At the operation 802, the computing device receives a touch gesture and sensor orientations. The sensor orientations may include $R_h$, the orientation of the touch receiver, and $R_w$, the orientation associated with the touch effector.

At the operation 804, the computing device classifies the touch gesture as a tap, a swipe, etc.

At the operation 806, the computing device calculates the relative orientation, $R_c$. The first relative orientation may include pitch, yaw and roll information. Notably, the operation 806 may be performed prior to, or contemporaneous to, the operation 804.

At the operation 808, the computing device integrates the touch gesture with the orientation context (e.g., tap with yaw rotation 90°; tap with finger slide, etc.) in order to generate a classification for the touch event.

Figure 9:
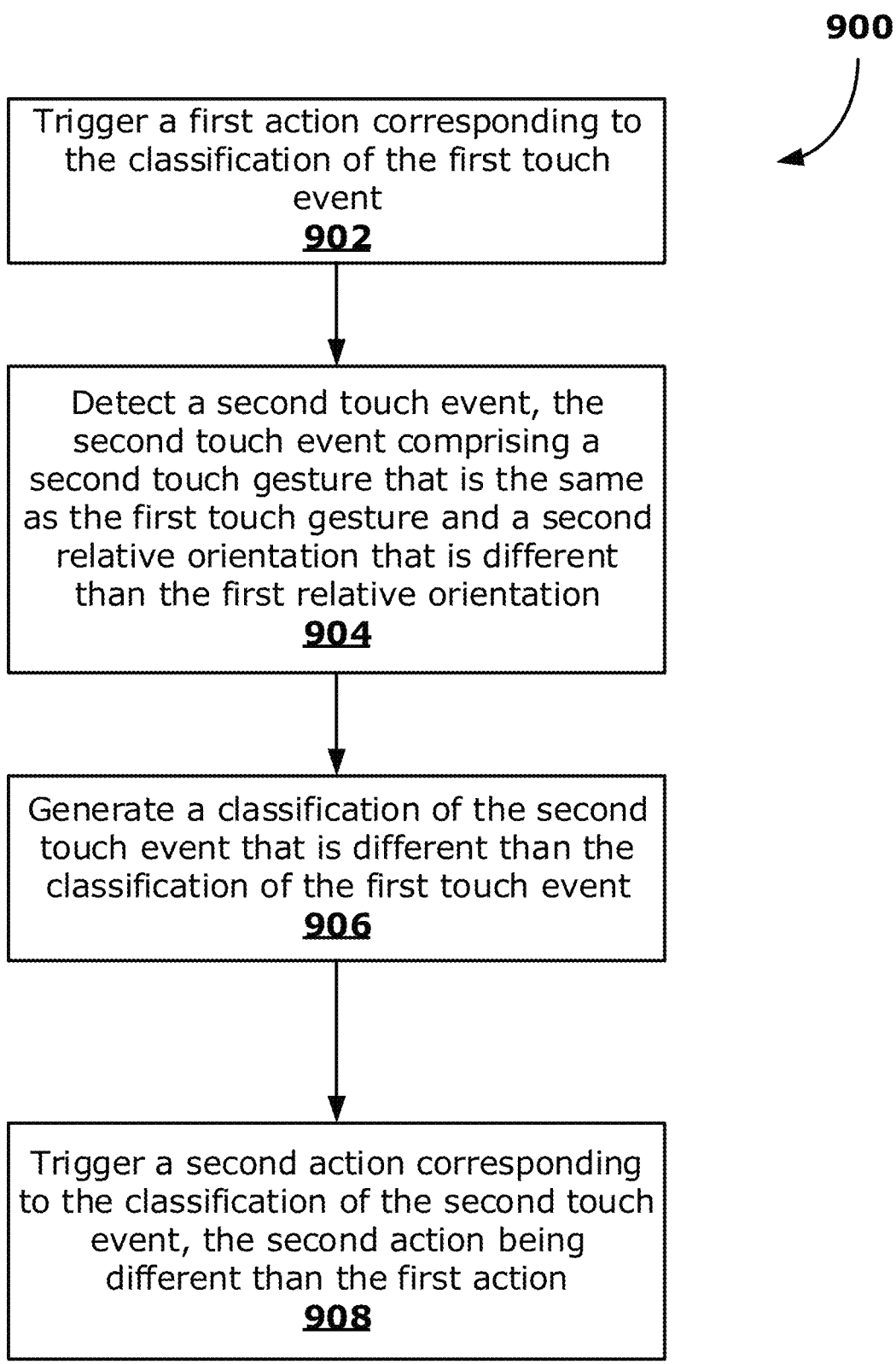
FIG. 9 is a flowchart of a method for triggering a second action corresponding to the classification of a second touch event, in accordance with examples described herein.

FIG. 9 is a flowchart that shows an example method 800 for triggering a second action corresponding to the classification of a second touch event, the second action being different from the first action. In some implementations, the method 900 may be performed following the method 700 of generating a classification of the first touch event. The method 900 may be performed by one or more processors of a computing device. Specifically, the operations 902 and onward may be performed by one or more processors of a touch device apparatus or by one or more processors of an XR computing device.

At the operation 902, the system triggers a first action corresponding to the classification of the first touch event. This action may be unique to the combination of touch gesture and relative orientation corresponding to the first touch event. The first relative orientation may include pitch, yaw and roll information.

At the operation 904, the system detects a second touch event, the second touch event comprising a second touch gesture that is the same as the first touch gesture and a second relative orientation that is different than the first relative orientation. The second touch gesture may have a displacement parameter and/or a time duration parameter. The second relative orientation may include pitch, yaw and roll information.

At the operation 906, the system generates a classification of the second touch event that is different than the classification of the first touch event. A touch event may comprise a touch gesture and a relative orientation, and the classification of a touch event may be based on the combination of the touch gesture and the relative orientation. As a result, even though two or more touch events may comprise the same touch gesture, the two or more touch events may each be classified differently due to differences in their respective relative orientations. In this way, the number of distinct touch gestures that can be recognized may be expanded by the addition of an orientation parameter. Thus, although the number of possible touch events may be limited due to the small size of the touch sensitive area on the touch sensor of the touch device, a large number of distinctly recognizable touch gestures may still be possible.

In some embodiments, classifying the second touch event is based on a duration parameter and/or a time duration parameter. In some embodiments, generating the classification of the second touch event using the second touch gesture and the second relative orientation may include generating the classification of the second touch event based on the second touch gesture and the pitch, yaw and roll information.

At the operation 908, the system triggers a second action corresponding to the classification of the second touch event, the second action being different than the first action.

FIGS. 10A and 10B illustrate example embodiments in connection with the method of FIG. 9.

FIG. 10A illustrates an example method 1000A, beginning with the operation 1002A, at which the computing device detects a first touch gesture associated with a first touch event. The first touch gesture may be, for example, a slide.

At the operation 1004A, the computing device determines a first relative orientation between the orientation associated with the touch effector and the orientation of the touch receiver to be $R_C(YPR)=(0,0,0)$. The first relative orientation may be determined by calculating the cross product of the orientation associated with the touch effector and the orientation of the touch receiver. The first relative orientation may include pitch, yaw and roll information.

At the operation 1006A, the computing device classifies the first touch event as a slide with a finger pad. In some embodiments, the finger pad classification may be associated with the orientation $R_C(YPR)=(0,0,0)$.

At the operation 1008A, the computing device adjusts the audio volume. In some embodiments, adjusting the audio volume may be a triggered first action corresponding to the classification of the first touch event, namely, a slide with a finger pad.

FIG. 10B illustrates an example method 1000B, beginning with the operation 1002B, at which the computing device detects a second touch gesture associated with a second touch event. In some embodiments, the second touch gesture may be the same as the first touch gesture. The second touch gesture may be, for example, a slide.

At the operation 1004B, the computing device determines a second relative orientation between the orientation associated with the touch effector and the orientation of the touch receiver to be $R_C(YPR)=(90,0,0)$. In some embodiments, the second relative orientation may be different than the first relative orientation. The second relative orientation may be determined by calculating the cross product of the orientation associated with the touch effector and the orientation of the touch receiver. The second relative orientation may include pitch, yaw and roll information.

At the operation 1006B, the computing device classifies the second touch event as a slide with a finger side. In some embodiments, the finger side classification may be associated with the orientation $R_C(YPR)=(90,0,0)$.

At the operation 1008B, the computing device adjusts an audio playhead. Adjusting the audio playhead may be a triggered second action corresponding to the classification of the second touch event, namely, a slide with a finger side. In some embodiments, the second action may be different than the first action.

FIGS. 11A and 11B illustrate example embodiments in connection with the method of FIG. 9

FIG. 11A illustrates an example method 1100A, beginning with the operation 1102A, at which the computing device detects a first touch gesture associated with a first touch event. The first touch gesture may be, for example, a double tap.

At the operation 1104A, the computing device determines a first relative orientation between the orientation associated with the touch effector and the orientation of the touch receiver to be $R_C(YPR)=(0,0,0)$. The first relative orientation may be determined by calculating the cross product of the orientation associated with the touch effector and the orientation of the touch receiver. The first relative orientation may include pitch, yaw and roll information.

At the operation 1106A, the computing device classifies the first touch event as a slide with a finger pad. In some embodiments, the finger pad classification may be associated with the orientation $R_C(YPR)=(0,0,0)$.

At the operation 1108A, the computing device activates a voice assistant. In some embodiments, activating the voice assistant may be a triggered first action corresponding to the classification of the first touch event, namely, a double tap with a finger pad.

FIG. 11B illustrates an example method 1100B, beginning with the operation 1102B, at which the computing device detects a second touch gesture associated with a second touch event. In some embodiments, the second touch gesture may be the same as the first touch gesture. The second touch gesture may be, for example, a double tap. The system may include a touch device apparatus and an effector orientation sensor. The touch device apparatus may include a touch receiver, a processor and a memory as components. The touch device apparatus may be, for example, a smartglasses, a smartwatch, a tablet, or a smartphone, etc.

At the operation 1104B, the computing device system determines a second relative orientation between the orientation associated with the touch effector and the orientation of the touch receiver to be $R_C(YPR)=(90,0,0)$. In some embodiments, the second relative orientation may be different than the first relative orientation. The second relative orientation may be determined by calculating the cross product of the orientation associated with the touch effector and the orientation of the touch receiver. The second relative orientation may include pitch, yaw and roll information.

At the operation 1106B, the computing device classifies the second touch event as a double tap with a finger side. In some embodiments, the finger side classification may be associated with the orientation $R_C(YPR)=(90,0,0)$.

At the operation 1108B, the computing device takes a picture. Taking a picture may be a triggered second action corresponding to the classification of the second touch event, namely, a double tap with a finger side. In some embodiments, the second action may be different than the first action.

Figure 12:
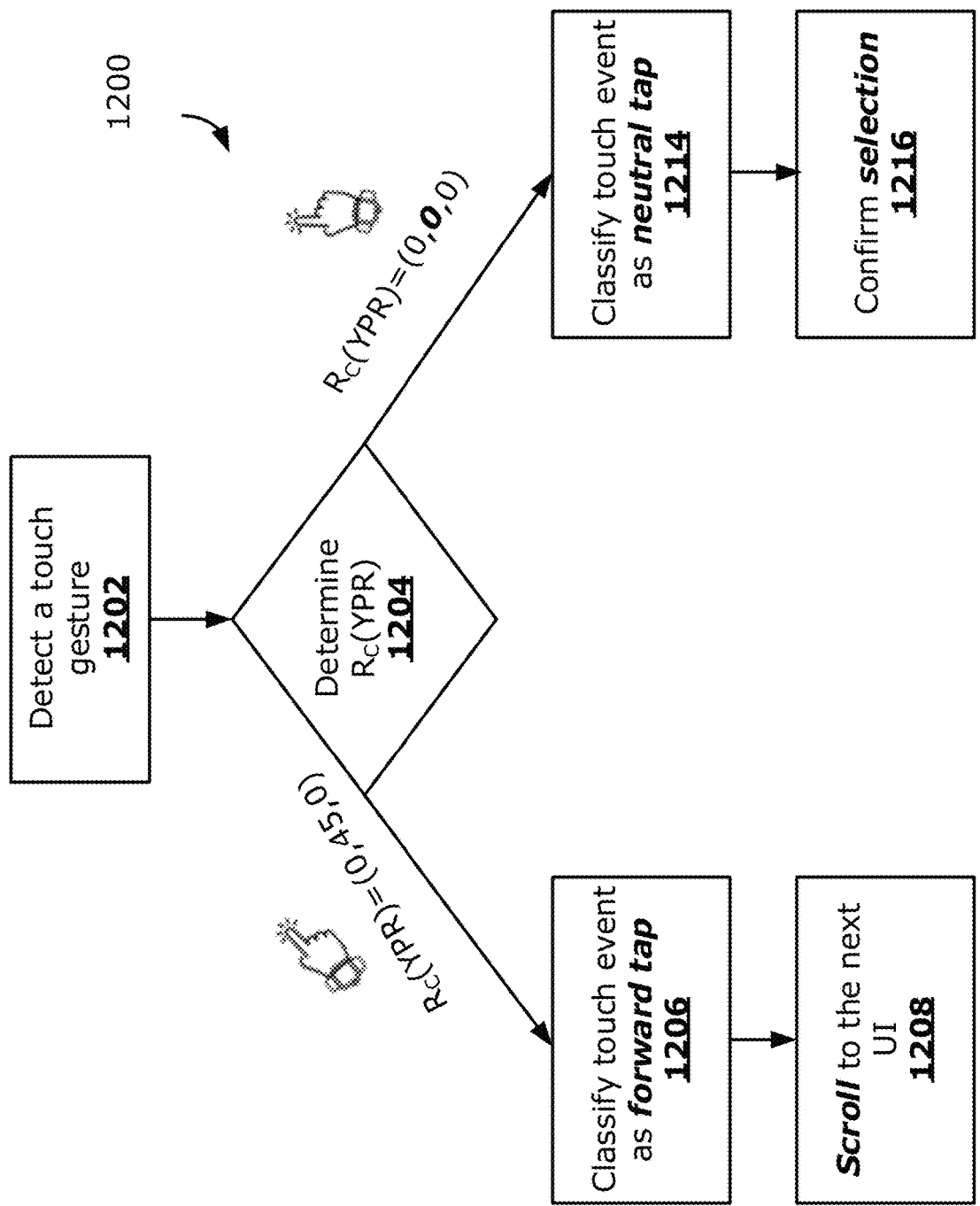
FIG. 12 illustrates a decision tree for scrolling and selecting graphical user interface (GUI) elements using a touch gesture at a single button, in accordance with examples described herein.

FIG. 12 illustrates an example decision tree 1200 for scrolling and selecting graphical user interface (GUI) elements using a single button.

As a single button does not contain inherent spatial capacity, a system usually needs at least two buttons to enable spatial meaning (e.g., a left button and a right button). As will be described with respect to the decision tree 1100, in some embodiments of the present disclosure, the system detects touch gestures in the absence of direct directional information, using orientation information instead. In some such embodiments, the system may infer directional information based on $R_C$. In this way, activities commonly requiring more than one button, such as scrolling and selecting GUI elements, may be performed using a single button.

The decision tree 1200 begins with the operation 1202, at which the system detects a touch gesture associated with a touch event. The touch gesture may be, for example, a tap.

At the operation 1204, the system determines a relative orientation, $R_C(YPR)$, between the orientation associated with the touch effector and the orientation of the touch receiver. The relative orientation may be determined by calculating the cross product of the orientation associated with the touch effector and the orientation of the touch receiver. The relative orientation may include pitch, yaw and roll information.

When the system determines $R_C(YPR)=(0,45,0)$, the decision tree 1100 proceeds to the operation 1106. At the operation 1106, the system classifies the touch event as a forward tap. In some embodiments, the forward classification may be associated with the orientation $R_C(YPR)=(0,45,0)$. For example, when the pitch element associated with a tap is greater than a certain threshold, (e.g., when P is ≥25 for $R_C(YPR)$), the system may classify the touch event as a forward tap. Likewise when the pitch element associated with a tap is less than the same threshold, (e.g., when P is <25 for $R_C(YPR)$), the system may classify the touch event as a neutral tap.

Following the classification of the touch event as a forward tap, the decision tree 1200 proceeds to the operation 1108.

At the operation 1108, the system scrolls to the next user interface (UI). Scrolling to the next UI may be a triggered action corresponding to the forward tap classification.

Following the operation 1204, when the system determines $R_C(YPR)=(0,0,0)$, the decision tree 1200 proceeds to the operation 1114. At the operation 1214, the system classifies the touch event as a neutral tap. In some embodiments, the neutral classification may be associated with the orientation $R_C(YPR)=(0,0,0)$. For example, when the pitch element associated with a tap is less than a certain threshold, (e.g., when P is <25 for $R_C(YPR)$), the system may classify the touch event as a neutral tap.

Following the classification of the touch event as a neutral tap, the decision tree 1200 proceeds to the operation 1216.

At the operation 1216, the system confirms selection. Confirming selection may be a triggered action corresponding to the neutral tap classification.

Figure 13:
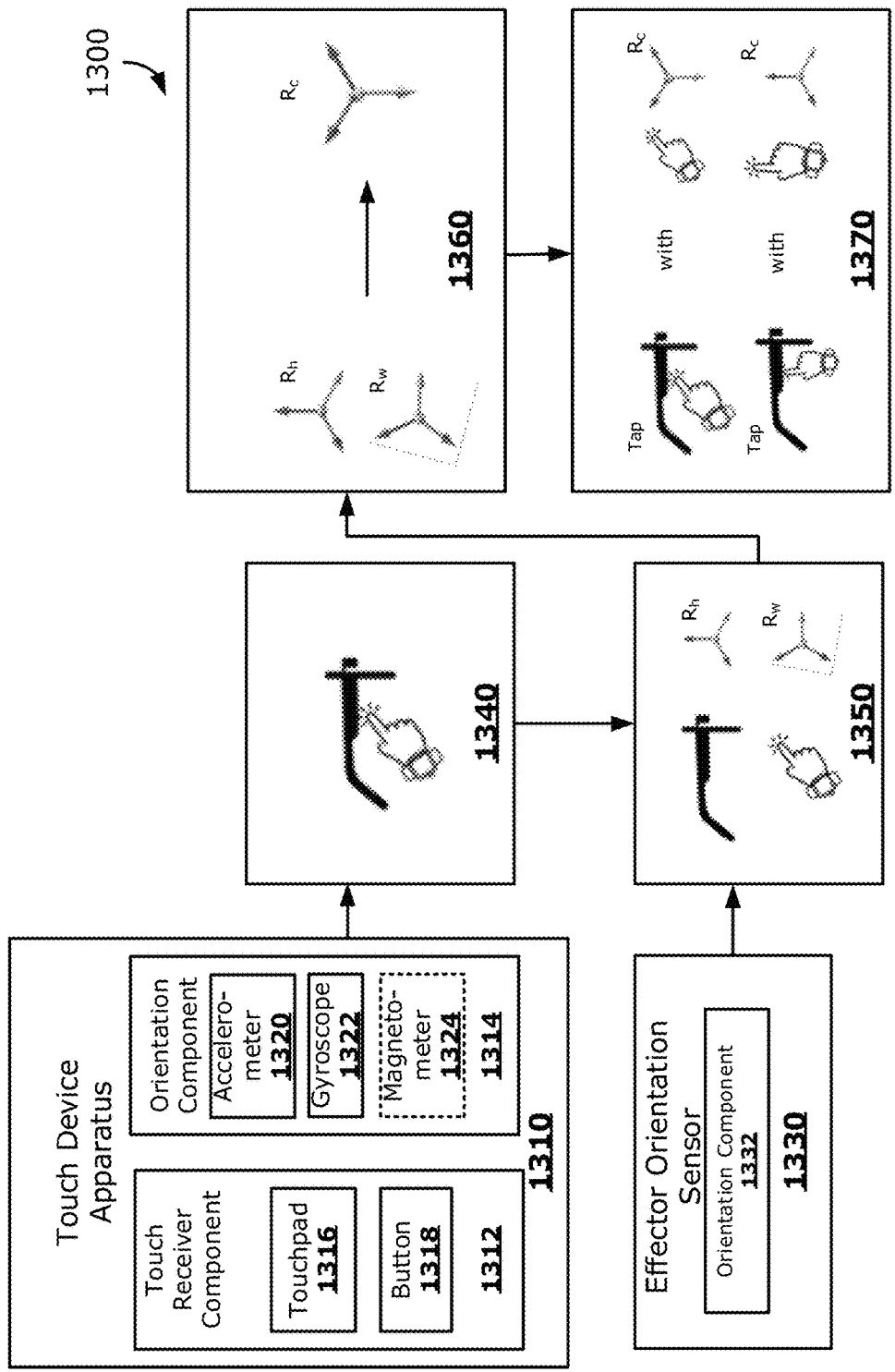
FIG. 13 shows a first schematic diagram, in accordance with examples described herein.

In some examples, the methods described above may be implemented in a pair of smartglasses, in cooperation with a smart watch, to enable a larger number of distinctly recognizable touch gestures that can be used by the user to trigger a variety of actions. For example, FIG. 13 shows a first schematic diagram 1300, in accordance with an embodiment of the present disclosure.

The first schematic diagram 1300 illustrates operations 1340-1370 which may be performed by a system, such as a processor of a computing device, for example, based on input received from components of a touch device apparatus 1310 and an effector orientation sensor 1330, to classify a touch event (e.g., using an example of the methods described above). The first schematic diagram 1300 relates to an example implementation where the touch device apparatus is a smartglasses, the touch receiver may be a touchpad and/or a button, the effector orientation sensor is a smartwatch, and the touch effector is a finger, and the effector orientation sensor is provided by a wrist wearable.

The touch device apparatus 1310 comprises a touch receiver component 1312 and a touch device apparatus orientation component 1314. The touch receiver component 1312 may comprise a touchpad 1316 and/or a button 1318 and/other another touch receiving apparatus. The touch device apparatus orientation component 1314 comprises an accelerometer 1320 and a gyroscope 1322, and may be described as an IMU. The touch device apparatus orientation component may optionally further comprise a magnetometer 1324. In some embodiments, the accelerometer 1320 may be a 3-axis accelerometer and the gyroscope 1322 may be a 3-axis gyroscope. The combination of the 3-axis accelerometer and the 3-axis gyroscope may be referred to as a 6-axis system, providing two different measurements along each of the three axes for a total of six measurements. The magnetometer 1324 may be a 3-axis magnetometer and may provide extra precision to the orientation module.

The effector orientation sensor 1330 comprises an effector orientation sensor orientation component 1332. The effector orientation sensor orientation component 1332 may be described as an IMU, and may comprise an accelerometer, a gyroscope, and/or a magnetometer.

At the operation 1340, the system receives input from the touch device apparatus and detects a touch gesture on the smartglasses. In some embodiments, when the system detects a touch gesture, the system may then determine $R_h$ and $R_w$ individually through their respective orientation components 1314, 1332.

At the operation 1350, the system receives input from the effector orientation sensor of the touch device apparatus 1310 and from the effector orientation sensor 1330, and obtains the orientation of the smartglasses as $R_h$ and determines the orientation of the smartwatch as $R_w$. Both $R_h$ and $R_w$ may be calculated via conventional methods of IMU.

At the operation 1360, the system calculates the relative orientation (which may also be described as a correlated orientation) using $R_h$ and $R_w$ as inputs. The relative orientation, $R_c$, may be calculated mathematically by determining the cross product of $R_h$ and $R_w$. That is, the relative orientation $R_c$ may be calculated as follows:

$$R_c = R_h \times R_w^{-1}$$

where $R_h$ is the orientation of the smartglasses and $R_w$ is the orientation of the wrist wearable.

At the operation 1370, the system classifies the touch event based on the detected touch gesture and the corresponding calculated relative orientation, $R_c$. For example, the touch event may be classified as a "tap with a forward facing finger" or as a "tap with a vertical finger" etc.

Figure 14:
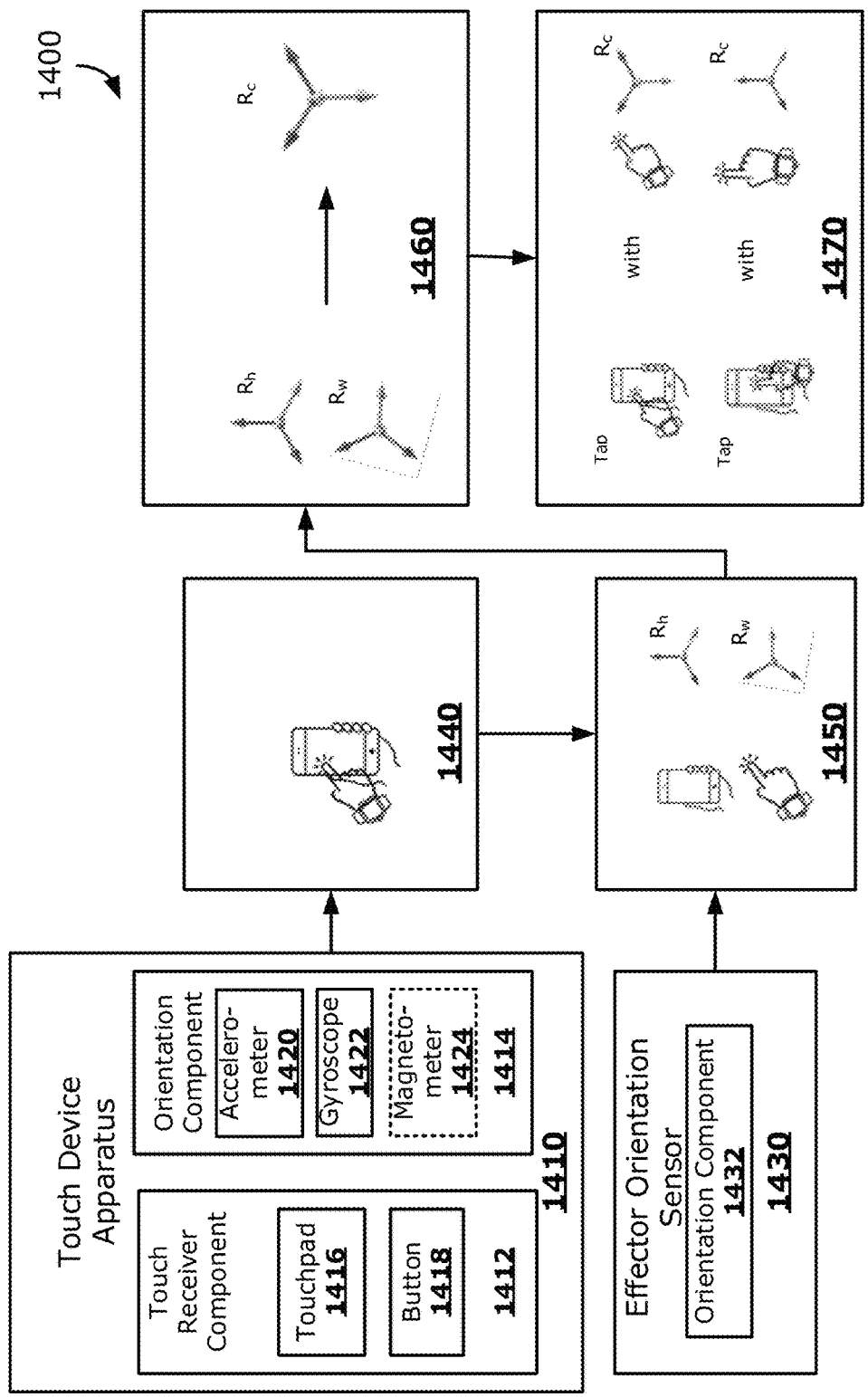
FIG. 14 shows a second schematic diagram, in accordance with examples described herein.

In some examples, the methods described above may be implemented in a smartphone, in cooperation with a smart watch, to enable a larger number of distinctly recognizable touch gestures that can be used by the user to trigger a variety of actions. For example, FIG. 14 shows another schematic diagram 1400, in accordance with an embodiment of the present disclosure.

The schematic diagram 1400 illustrates operations 1440-1470 which may be performed by a system, such as a processor of a computing device, for example, based on input received from components of a touch device apparatus 1410 and an effector orientation sensor 1430, to classify a touch event (e.g., using an example of the methods described above). The schematic diagram 1400 relates to an example implementation where the touch device apparatus is a smartphone, the touch receiver maybe a touchpad and/or a button, the effector orientation sensor is a smartwatch, the touch effector is a finger, and the effector orientation sensor is provided by a smartwatch.

The touch device apparatus 1410 comprises a touch receiver component 1212 and a touch device apparatus orientation component 1414. The touch receiver component 1412 may comprise a touchpad 1416 and/or a button 1418 and/other another touch receiving apparatus. The touch device apparatus orientation component 1414 comprises an accelerometer 1420 and a gyroscope 1422, and may be described as an IMU. The touch device apparatus orientation component may optionally further comprise a magnetometer 1424. In some embodiments, the accelerometer 1420 may be a 3-axis accelerometer and the gyroscope 1422 may be a 3-axis gyroscope. The combination of the 3-axis accelerometer and the 3-axis gyroscope may be referred to as a 6-axis system, providing two different measurements along each of the three axes for a total of six measurements. The magnetometer 1424 may be a 3-axis magnetometer and may provide extra precision to the orientation module.

The effector orientation sensor 1430 comprises an effector orientation sensor orientation component 1432. The effector orientation sensor orientation component 1432 may be described as an IMU, and may comprise an accelerometer, a gyroscope, and/or a magnetometer.

At the operation 1440, the system receives input from the touch device apparatus and detects a touch gesture on the smartphone. In some embodiments, when the system detects a touch gesture, the system may then determine $R_h$ and $R_w$ individually through their respective orientation components 1414, 1432.

At the operation 1450, the system receives input from the effector orientation sensor of the touch device apparatus 1410 and from the effector orientation sensor 1430, and obtains the orientation of the smartglasses as $R_h$ and determines the orientation of the smartwatch as $R_w$. Both $R_h$ and $R_w$ may be calculated via conventional methods of IMU.

At the operation 1460, the system calculates the relative orientation (which may also be described as a correlated orientation) using $R_h$ and $R_w$ as inputs. The relative orientation, $R_c$, may be calculated mathematically by determining the cross product of $R_h$ and $R_w$. That is, the relative orientation $R_c$ may be calculated as follows:

$$R_c = R_h \times R_w^{-1}$$

where $R_h$ is the orientation of the smartglasses and $R_w$ is the orientation of the wrist wearable.

At the operation 1470, the system classifies the touch event based on the detected touch gesture and the corresponding calculated relative orientation, $R_c$. For example, the touch event may be classified as a "tap with a forward facing finger" or as a "tap with a vertical finger" etc.

Previous examples of the present disclosure have included a touch device apparatus, such as a smartglasses, a smart watch, a tablet, or a smartphone cooperating with an effector orientation sensor, such as a smartwatch, a smartring or a smartband. In addition, the present disclosure may be embodied in other ways, including for XR applications, such as VR, AR, and MR applications.

Although the preceding examples focus on the use of an IMU to detect orientation, the present disclosure is not so limited. Embodiments of the present disclosure may use other methods, such as computer vision, for example, to detect orientation.

Figure 15:
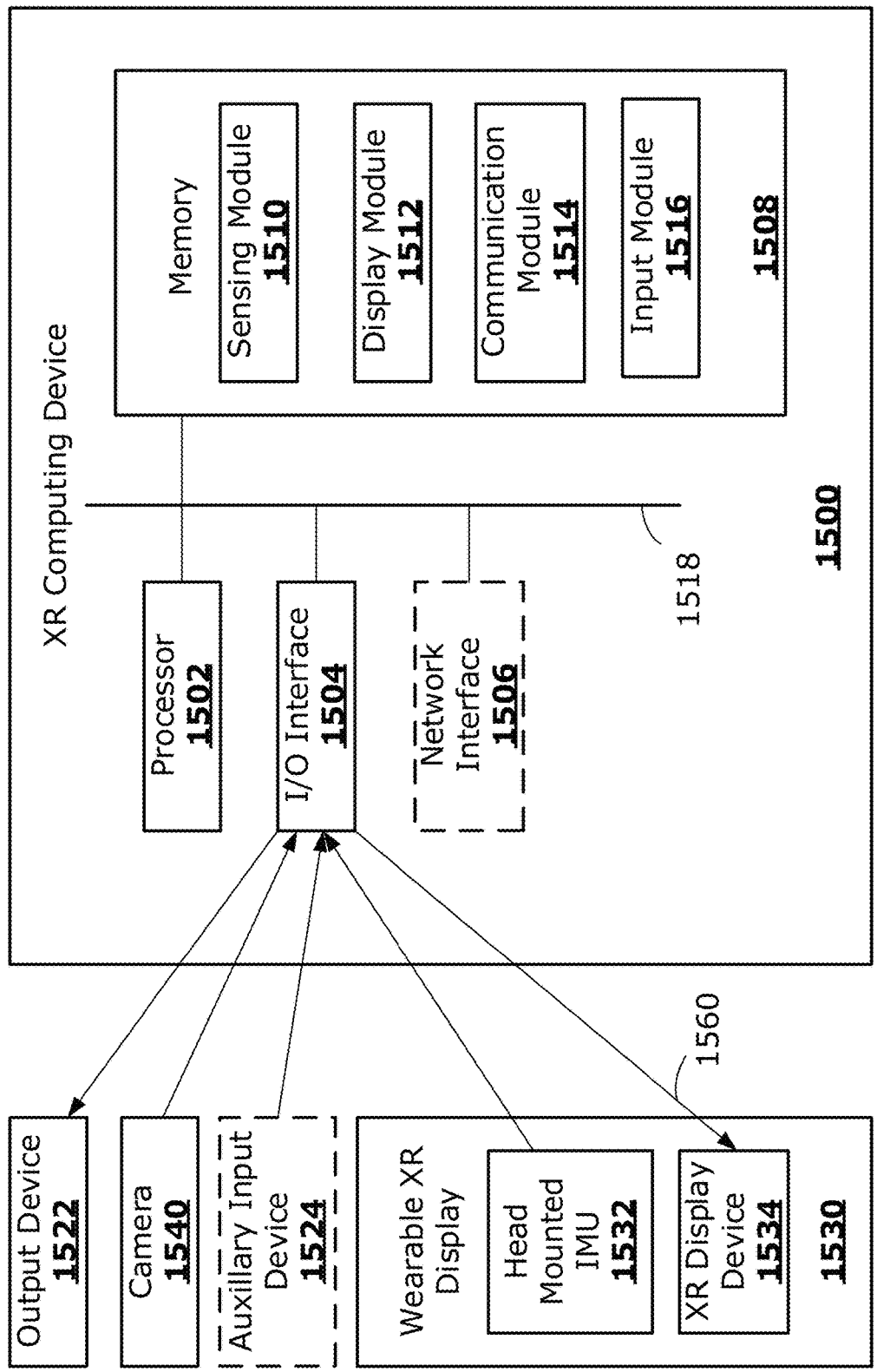
FIG. 15 is a block diagram showing components of an example XR computing device, in accordance with examples described herein.

FIG. 15 is a block diagram showing components of an example XR computing device 1500. Although an example embodiment of the XR computing device 1500 is shown and discussed below, other embodiments may be used to implement examples disclosed herein, which may include components different from those shown. Although FIG. 15 shows a single instance of each component of the XR computing device 1500, there may be multiple instances of each component shown. Furthermore, whereas the XR computing device 1500 will be described as a single device, it will be appreciated that the various functions and components of the XR computing device 1500 may be duplicated or divided among two, three, or more distinct devices. The XR computing device 1500 may be an example of the XR computing device 160 of FIG. 1B.

The XR computing device 1500 includes one or more processors, such as a central processing unit, a microprocessor, an application-specific integrated circuit (ASIC), a field-programmable gate array (FPGA), a dedicated logic circuitry, or combinations thereof. The one or more processors may collectively be referred to as a "processor device" or simply a processor 1502.

The XR computing device 1500 also includes one or more input/output (I/O) interfaces, collectively referred to as I/O interface 1504, which interfaces with input devices including a camera 1540 and one or more optional auxiliary input device 1524 (such as a mouse or keyboard), output devices 1522 (such as a 2D display or speakers), a head mounted IMU 1532 of the wearable XR display 1530, and the XR display device 1534 of the wearable XR display 1530.

The XR computing device 1500 may include one or more optional network interfaces 1506 for wired or wireless communication with a network (e.g., an intranet, the Internet, a P2P network, a WAN and/or a LAN) or other node. The network interface(s) 1506 may include wired links (e.g., Ethernet cable) and/or wireless links (e.g., one or more antennas) for intra-network and/or inter-network communications. In some embodiments, one or more network interfaces 1506 may be used as, or instead of, the I/O interface 1504 for communication with one or more of the input devices and/or output devices described above, for example using 802.11 or Bluetooth™ wireless communication.

The XR computing device 1500 includes one or more memories, collectively referred to as memory 1508, which may include a volatile or non-volatile memory (e.g., a flash memory, a random access memory (RAM), and/or a read-only memory (ROM)). The non-transitory memory 1508 may store machine-executable instructions for execution by the processor 1502, such as to carry out examples described in the present disclosure. A set of machine-executable instructions defining a sensing module 1510, a display module 1512, a communication module 1514, and an input module 1516 are shown stored in the memory 1508, which may be executed by the processor 1502 to perform the computational operations described herein. The memory 1508 may include other software instructions, such as for implementing an operating system and other applications or functions.

In some examples, the XR computing device 1500 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the XR computing device 1500) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the XR computing device 1500 may communicate with each other via various means, such as a data bus 1518. In some embodiments, the operations of the XR computing device 1500 may not performed by a distributed computing system, such as a cloud computing system or a virtual machine instance implemented over one or more servers. The camera 1540 may capture a video view, and the video view may include the hands of a user of the XR computing device 1500. The user may wear haptics gloves on his hands. The user may use one of his hands as a virtual touchpad, in a similar manner to that of using a smartphone or a smartpad. The index finger of a first hand of the user may operate as a touch effector and the palm of a second hand of the user may operate as a touch receiver. The camera 1540 may be configured to identify the touch effector and the touch receiver in the video view.

In some embodiments, the processor 1502 of the XR computing device 1500 may use computer vision techniques to detect a touch event between the index finger of the first hand (touch effector) and the palm of the second hand (touch receiver). The touch event may comprise a touch gesture and a touch orientation. The touch gesture may have a displacement parameter and/or a time duration parameter.

In some embodiments, the processor of the XR computing device 1500 may then determine a touch gesture. In some embodiments, the first touch gesture may have a spatial displacement parameter and/or a time duration parameter. For example, a touch gesture having a spatial displacement parameter may include additional contextual meaning based on the spatial properties of the touch gesture upon the palm of the second hand (touch receiver), (for example, sequential touching at different locations, multi-touch, swipe, etc.). As another example, a touch gesture having a time duration parameter may include additional contextual meaning based upon the duration of the touch gesture upon the palm of the second hand (touch receiver) (for example, double tap, triple tap, long press, etc.). A touch gesture may have both a spatial displacement parameter and a time duration parameter.

In some embodiments, the processor of the XR computing device 1500 may then use computer vision techniques to determine an orientation associated with the index finger of the first hand (touch effector) and an orientation of the palm of the second hand (touch receiver).

In some embodiments, the processor of the XR computing device 1500 may then calculate a first relative orientation between the orientation associated with the index finger of the first hand (touch effector) and an orientation of the palm of the second hand (touch receiver). In some embodiments, the first relative orientation may be calculated by obtaining the cross product of the orientation associated with the index finger of the first hand (touch effector) and an orientation of the palm of the second hand (touch receiver). In other words, the first relative orientation may be calculated according to:

$$R_c = R_h \times R_w^{-1}$$

where $R_h$ is the is the orientation of the index finger of the first hand (touch effector), $R_w$ is the orientation associated with the and an orientation of the palm of the second hand (touch receiver), and $R_c$ is the first relative orientation between the orientation associated with the index finger of the first hand (touch effector) and the orientation of the palm of the second hand (touch receiver). The first relative orientation may include pitch, yaw and roll information. It should be understood that other techniques for calculating the first relative orientation may be used.

In some embodiments, the processor of the XR computing device 1500 may then generate a classification of the touch event based on the touch gesture and the first relative orientation. In this way, the same touch gesture (e.g., a tap) may be classified as a different touch event based on a difference in $R_c$, thereby expanding the number of distinctly recognizable touch events to a wide range of motion of a human hand.

Figure 16:
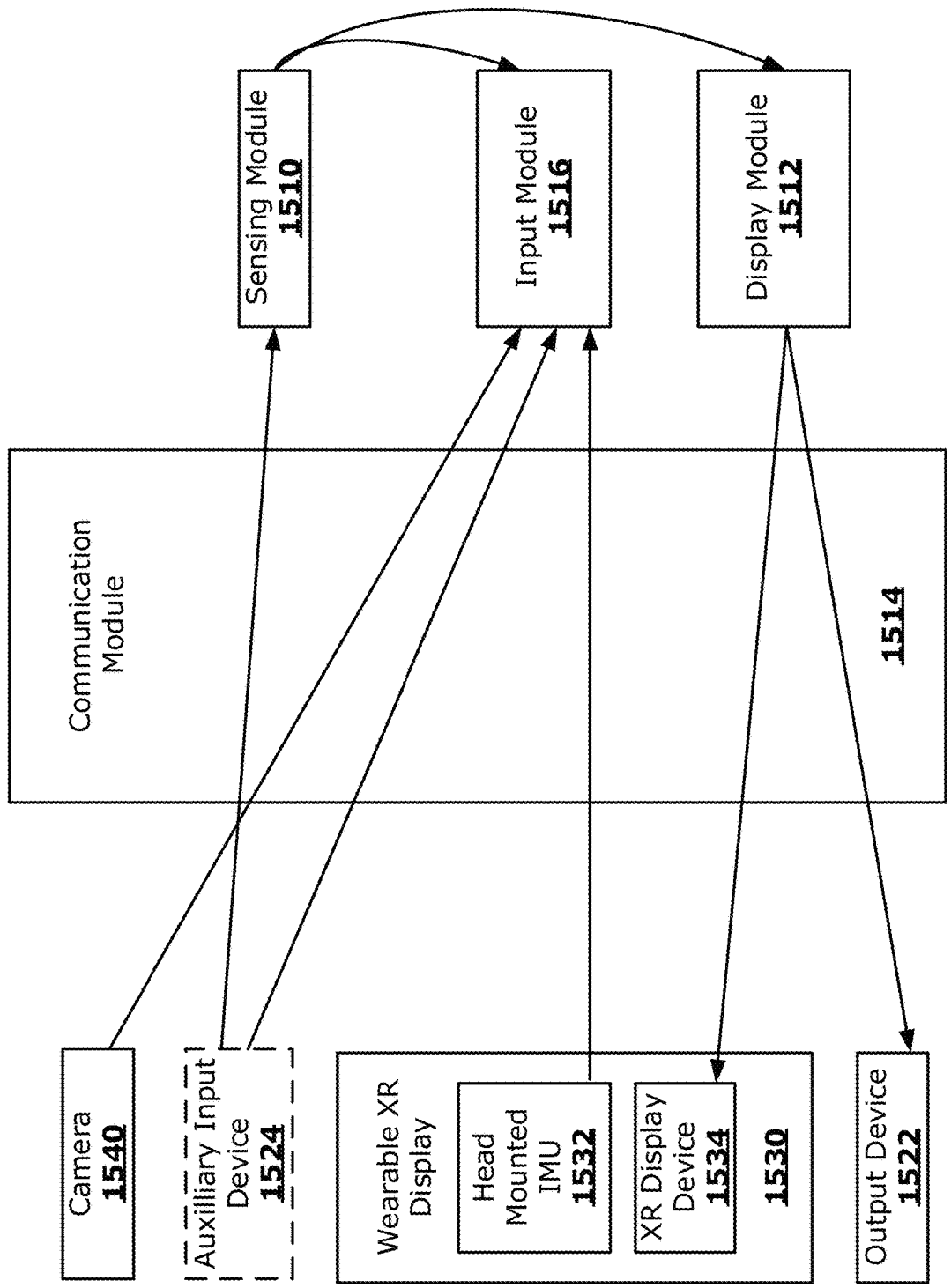
FIG. 16 is a block diagram showing interoperation of the modules of FIG. 15.

FIG. 16 is a block diagram showing interoperation of the modules 1510, 1512, 1514, 1516 with the various peripheral devices shown in FIG. 15.

Communication module 1514 mediates the interaction of the XR computing device with all peripheral devices. The peripheral devices shown in FIG. 16 include the output devices 1622, the input devices including the camera 1540 and the optional auxiliary input devices 1524, the head mounted IMU 1532 of the wearable XR display 1530, and the XR display device 1534 of the wearable XR display 1530. The communication module 1514 may be configured to receive, process, and route to and from the other modules 1510, 1512, 1516 various types of input and output data to and from the peripheral devices. The input data may include user input data and/or sensor data received from some peripheral devices, and the output data may include control data and/or output data transmitted to some peripheral devices. The communication module 1514 may be generally responsible for setting up and ending communication sessions and channels with external devices (such as the wearable XR display 1530), and for sending or routing data to its appropriate destination.

The input module 1516 is configured to receive (via the communication module 1514) input data from the various input devices, including the camera 1540 and the one or more auxiliary input devices 2524, and sensors and process the input data to provide software commands to other software modules of the XR computing device.

The input module 1516 is configured to receive (via the communication module 1514) input data from the various input devices and sensors and process the input data to provide software commands to other software modules of the XR computing device. For example, the input module 1516 may be configured to process images captured by the virtual camera 1540 showing movements of the fingers of a first hand of a user in relation to the palm of a second hand of a user, using computer vision techniques for implementing a virtual touchpad. Similarly, in embodiments where a user wears haptic gloves, the input module 1516 may be configured to process images captured by the camera 1540 showing movements of a user's fingers in relation to one or more tactile input surfaces on one or more of the haptic gloves to generate tactile data, such as pointer data or gesture data, using computer vision techniques for implementing a gesture recognition system and/or a virtual pointer device. The input module 1516 may also process other input data to generate other forms of data usable by other software modules, such as processing IMU data received from the head mounted IMU 1532 and/or from the haptic gloves to generate user head and/or hand orientation and head and/or hand movement data usable by other modules to implement and manage the XR user session. In some embodiments, the input module 1516 may include one or more sub-modules, each sub-module being configured to process input from a respective input modality. In some embodiments, the input module 1516 may include a camera input sub-module for processing input received from one or more of the cameras 1540. In some embodiments, the input module 1516 may include a tactile or tangible input sub-module for processing input received from the one or more touch sensitive surfaces, and/or one or more mechanical sensors, (such as a button). In some embodiments, the input module 1516 may include an IMU input sub-module for processing input received from the head mounted IMU 1532 and/or IMU data received from haptic gloves. The camera 1540 may capture a video view, and the video view may include the hands of a user of the XR computing device 1500. The user may wear haptics gloves on his hands. The user may use one of his hands as a virtual touchpad, in a similar manner to that of using a smartphone or a smartpad. A first hand of the user may operate as a touch effector and a second hand of the user may operate as a touch receiver. The camera 1540 may be configured to identify the touch effector and the touch receiver in the video view.

In some embodiments, the processor of the XR computing device 1500 may use tactile data generated from the haptic gloves to detect a touch event between the index finger of the first hand (touch effector) and the palm of the second hand (touch receiver). The touch event may comprise a touch gesture and a touch orientation. The touch gesture may have a displacement parameter and/or a time duration parameter.

In some embodiments, the processor of the XR computing device 1500 may use tactile data generated from the haptic gloves to detect a touch gesture. In some embodiments, the touch gesture may have a spatial displacement parameter and/or a time duration parameter. For example, a touch gesture having a spatial displacement parameter may include additional contextual meaning based on the spatial properties of the touch gesture upon the touch receiver, (for example, sequential touching at different locations, multi-touch, swipe, etc.). As another example, a touch gesture having a time duration parameter may include additional contextual meaning based upon the duration of the touch gesture upon the touch receiver (for example, double tap, triple tap, long press, etc.). A touch gesture may have both a spatial displacement parameter and a time duration parameter.

In some embodiments, the processor of the XR computing device 1500 may use tactile data generated from the haptic gloves to determine an orientation associated with the index finger of the first hand (touch effector). The orientation associated with the index finger of the first hand may be determined, for example, via an IMU within the haptic gloves. In some embodiments, the haptic gloves may be described as an effector orientation sensor.

In some embodiments, the processor of the XR computing device 1500 may use tactile data generated from the haptic gloves to determine an orientation associated with the palm of the second hand (touch receiver). The orientation associated with the palm of the second hand (touch receiver) may be determined, for example, via an IMU within the haptic gloves. In some embodiments, the haptic gloves may be described as an effector orientation sensor.

In some embodiments, the processor of the XR computing device 1500 may then calculate a first relative orientation between the orientation associated with the index finger of the first hand (touch effector) and the orientation of the palm of the second hand (touch receiver). In some embodiments, the first relative orientation may be calculated by obtaining the cross product of the orientation associated with the index finger of the first hand (touch effector) and the orientation of the palm of the second hand (touch receiver). In other words, the first relative orientation may be calculated according to:

$$R_c = R_h \times R_w^{-1}$$

where $R_h$ is the is the orientation of the palm of the second hand (touch receiver), $R_w$ is the orientation associated with the index finger of the first hand (touch effector), and $R_c$ is the first relative orientation between the orientation associated with the index finger of the first hand (touch effector) and the orientation of the palm of the second hand (touch receiver). The first relative orientation may include pitch, yaw and roll information. It should be understood that other techniques for calculating the first relative orientation may be used.

In some embodiments, the processor of the XR computing device 1500 may then generate a classification of the first touch event based on the first touch gesture and the first relative orientation. In this way, the same touch gesture (e.g., a tap) may be classified as a different touch event based on a difference in $R_c$, thereby expanding the number of distinctly recognizable touch events to a wide range of motion of a human hand.

The display module 1512 is configured to generate visual output data for display on one or more display devices, such as the XR display device(s) 1534 of the wearable XR display 1530 and/or a 2D display connected to the XR computing device as an output device 1522. In some implementations, the visual output data may be routed to one or more such active display devices. In some embodiments, the display module 1512 is a more general output module configured to generate and/or route other forms of output data to various other output devices (such as output devices 1522). For example, in some implementations, the output module may be configured to route audio output data to one or more active audio output devices, such as speaker devices of the wearable XR display 1530 and/or a speaker connected to the XR computing device as an output device 1522.

GENERAL

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
a processor; and
a memory coupled to the processor, the memory storing instructions which, when executed by the processor, cause the system to:
   detect a first touch event, the first touch event being effected by a touch effector upon a touch receiver;
   determine a first touch gesture associated with the first touch event;
   calculate a first relative orientation between a first orientation associated with the touch effector and a second orientation of the touch receiver, calculation of the first relative orientation including determining the first orientation associated with the touch effector, determining the second orientation of the touch receiver, and calculating the first relative orientation as the first orientation relative to the second orientation; and
   generate a classification of the first touch event based on the first touch gesture and the first relative orientation.

2. The system of claim 1, further comprising:
at least one camera coupled to the processor for capturing a video view;
wherein the system is further configured to:
   identify the touch effector in the video view; and
   identify the touch receiver in the video view.

3. The system of claim 2, wherein the system is a virtual reality (VR) system; wherein the touch effector is a first hand of a user; and wherein the touch receiver is a second hand of the user.

4. The system of claim 1, further comprising:
an effector orientation sensor for sensing the first orientation associated with the touch effector.

5. The system of claim 4, wherein the first relative orientation is calculated according to:

$$R_c = R_h \times R_w^{-1}$$

where $R_h$ is the second orientation of the touch receiver, $R_w$ is the first orientation sensed by the effector orientation sensor, and $R_c$ is the first relative orientation.

6. The system of claim 4, wherein the effector orientation sensor is a wearable device that is in proximity to the touch effector.

7. The system of claim 4, wherein the touch receiver, the processor and the memory are components of a touch device apparatus.

8. The system of claim 7, wherein the system includes the touch device apparatus and the effector orientation sensor.

9. The system of claim 7, wherein the touch device apparatus is one of a type of a smartglasses, a smart watch, a tablet, or a smartphone.

10. The system of claim 1, wherein the first relative orientation includes pitch, yaw and roll information; and wherein generating the classification of the first touch event using the first touch gesture and the first relative orientation includes generating the classification of the first touch event based on the first touch gesture and the pitch, yaw and roll information.

11. The system of claim 1, wherein the system is further caused to:
trigger a first action corresponding to the classification of the first touch event.

12. The system of claim 11, wherein the system is further caused to:
detect a second touch event, the second touch event comprising a second touch gesture that is the same as the first touch gesture and a second relative orientation that is different than the first relative orientation;
generate a classification of the second touch event that is different than the classification of the first touch event; and
trigger a second action corresponding to the classification of the second touch event, the second action being different than the first action.

13. The system of claim 1, wherein the first touch gesture includes a displacement parameter and wherein classifying the first touch event is based on the displacement parameter.

14. The system of claim 1, wherein the first touch gesture includes a time duration parameter and wherein classifying the first touch event is based on the time duration parameter.

15. A method for classifying a first touch event, the method comprising:
detecting the first touch event, the first touch event being effected by a touch effector upon a touch receiver;
determining a first touch gesture associated with the first touch event;
calculating a first relative orientation between a first orientation associated with the touch effector and a second orientation of the touch receiver, calculating the first relative orientation including determining the first orientation associated with the touch effector, determining the second orientation of the touch receiver, and calculating the first relative orientation as the first orientation relative to the second orientation; and
generating a classification of the first touch event based on the first touch gesture and the first relative orientation.

16. The method of claim 15, wherein the first relative orientation is calculated according to:

$$R_c = R_h \times R_w^{-1}$$

where $R_h$ is the second orientation of the touch receiver, $R_w$ is the first orientation associated with the touch effector, and $R_c$ is the first relative orientation.

17. The method of claim 15, wherein the first relative orientation includes pitch, yaw and roll information; and wherein classifying the first touch event using the first relative orientation includes generating the classification of the first touch event based on the first touch gesture and the pitch, yaw and roll information.

18. The method of claim 15, further comprising:
triggering a first action corresponding to the classification of the first touch event.

19. The method of claim 18, further comprising:
detecting a second touch event, the second touch event comprising a second touch gesture that is the same as the first touch gesture and a second relative orientation that is different than the first relative orientation;
generating a classification of the second touch event that is different than the classification of the first touch event; and
triggering a second action corresponding to the classification of the second touch event, the second action being different than the first action.

20. A non-transitory computer-readable medium having machine-executable instructions stored thereon, the machine-executable instructions, when executed by a processor of a device, cause the device to:

detect a first touch event, the first touch event being effected by a touch effector upon a touch receiver;

determine a first touch gesture associated with the first touch event;

calculate a first relative orientation between a first orientation associated with the touch effector and a second orientation of the touch receiver, calculation of the first relative orientation including determining the first orientation associated with the touch effector, determining the second orientation of the touch receiver, and calculating the first relative orientation as the first orientation relative to the second orientation; and generate a classification of the first touch event based on the first touch gesture and the first relative orientation.

* * * * *